United States Patent
Tada et al.

(10) Patent No.: US 9,794,608 B2
(45) Date of Patent: Oct. 17, 2017

(54) VIDEO TRANSMISSION METHOD AND VIDEO TRANSMISSION APPARATUS

(71) Applicant: FUJITSU LIMITED, Kawasaki-shi, Kanagawa (JP)

(72) Inventors: Atsuko Tada, Tokorozawa (JP); Ryuta Tanaka, Machida (JP); Akira Nakagawa, Sagamihara (JP); Atsushi Oguchi, Kawasaki (JP); Junichi Koizumi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/977,857

(22) Filed: Dec. 22, 2015

(65) Prior Publication Data
US 2016/0212452 A1 Jul. 21, 2016

(30) Foreign Application Priority Data
Jan. 16, 2015 (JP) .................. 2015-007282

(51) Int. Cl.
*H04N 21/262* (2011.01)
*H04N 21/845* (2011.01)

(52) U.S. Cl.
CPC . *H04N 21/26233* (2013.01); *H04N 21/26258* (2013.01); *H04N 21/8456* (2013.01)

(58) Field of Classification Search
None
See application file for complete search history.

(56) References Cited

U.S. PATENT DOCUMENTS

| 5,732,217 A * | 3/1998 | Emura | H04N 7/17336 348/E5.008 |
| 2005/0278761 A1* | 12/2005 | Gonder | H04L 29/06027 725/95 |
| 2006/0233522 A1* | 10/2006 | Hiroi | H04N 5/783 386/241 |
| 2014/0101292 A1 | 4/2014 | Eriksson et al. | |

FOREIGN PATENT DOCUMENTS

JP  2013-089977  5/2013

OTHER PUBLICATIONS

Taiwanese Office Action dated Dec. 7, 2016 for corresponding Taiwanese Patent Application No. 104142973, with Partial English Translation, 25 pages. *Please note US-2006/0233522-A1 and US-5732217-A cited herewith, were previously cited by the Examiner on Oct. 21, 2016.*.
Korea Office Action dated Dec. 2, 2016 for corresponding Korean Patent Application No. 10-2016-0002787, with Partial English Translation, 12 pages.

* cited by examiner

*Primary Examiner* — Cai Chen
(74) *Attorney, Agent, or Firm* — Fujitsu Patent Center

(57) ABSTRACT

A video transmission method for transmitting, to a video playback device, a video data file group that corresponds to a selected scene from among a plurality of scenes included in video data, the video transmission method includes causing a processor to execute a process including making a length of time corresponding to each data file in a predetermined number of data files shorter than a length of time corresponding to a data file to be transmitted next after the transmission of the predetermined number of video data files, in which the predetermined number of video data files include a video data file to be first transmitted and are (Continued)

sequentially transmitted when sequentially transmitting video data files to the video playback device.

20 Claims, 39 Drawing Sheets

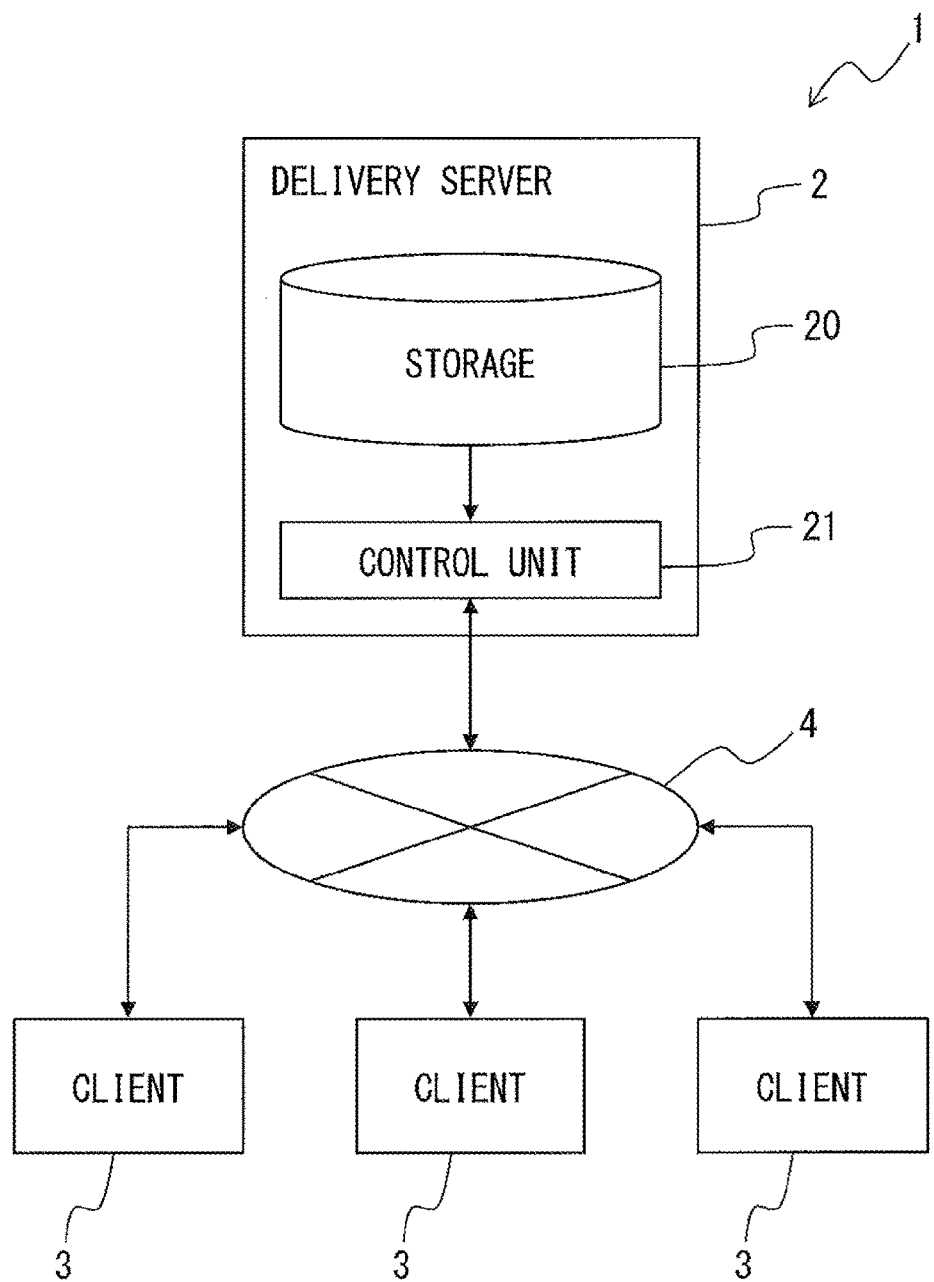
F I G. 1

| SCENE NO. | START TIME |
|---:|---:|
| 0 | 0 : 49 : 00 |
| 1 | 2 : 15 : 00 |
| 2 | 3 : 10 : 00 |
| ⋮ | ⋮ |
| N−1 | 50 : 47 : 00 |

F I G. 2 B

| FILE NAME | PLAYBACK TIME OF FILE (MINUNTE:SECOND:FRAME) |
|---|---|
| SF (0, 0) | 0 : 05 : 00 |
| SF (0, 1) | 0 : 05 : 00 |
| SF (0, 2) | 0 : 10 : 00 |
| SF (0, 3) | 0 : 10 : 00 |
| SF (0, 4) | 0 : 10 : 00 |
| SF (0, 5) | 0 : 09 : 00 |
| SF (1, 0) | 0 : 05 : 00 |
| SF (1, 1) | 0 : 05 : 00 |
| SF (1, 2) | 0 : 10 : 00 |
| ⋮ | ⋮ |
| SF (N-1, U) | 0 : 07 : 00 |

FIG. 2C

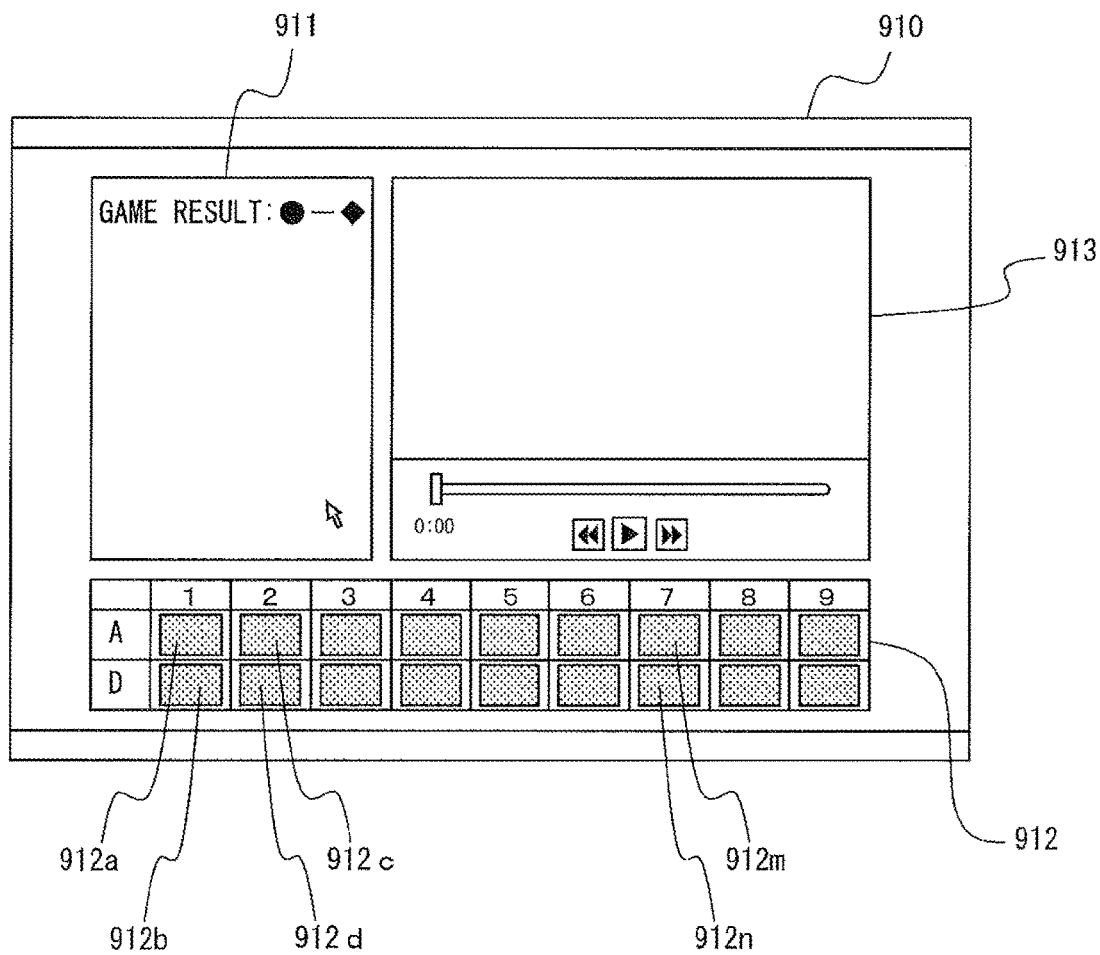
F I G. 3 B

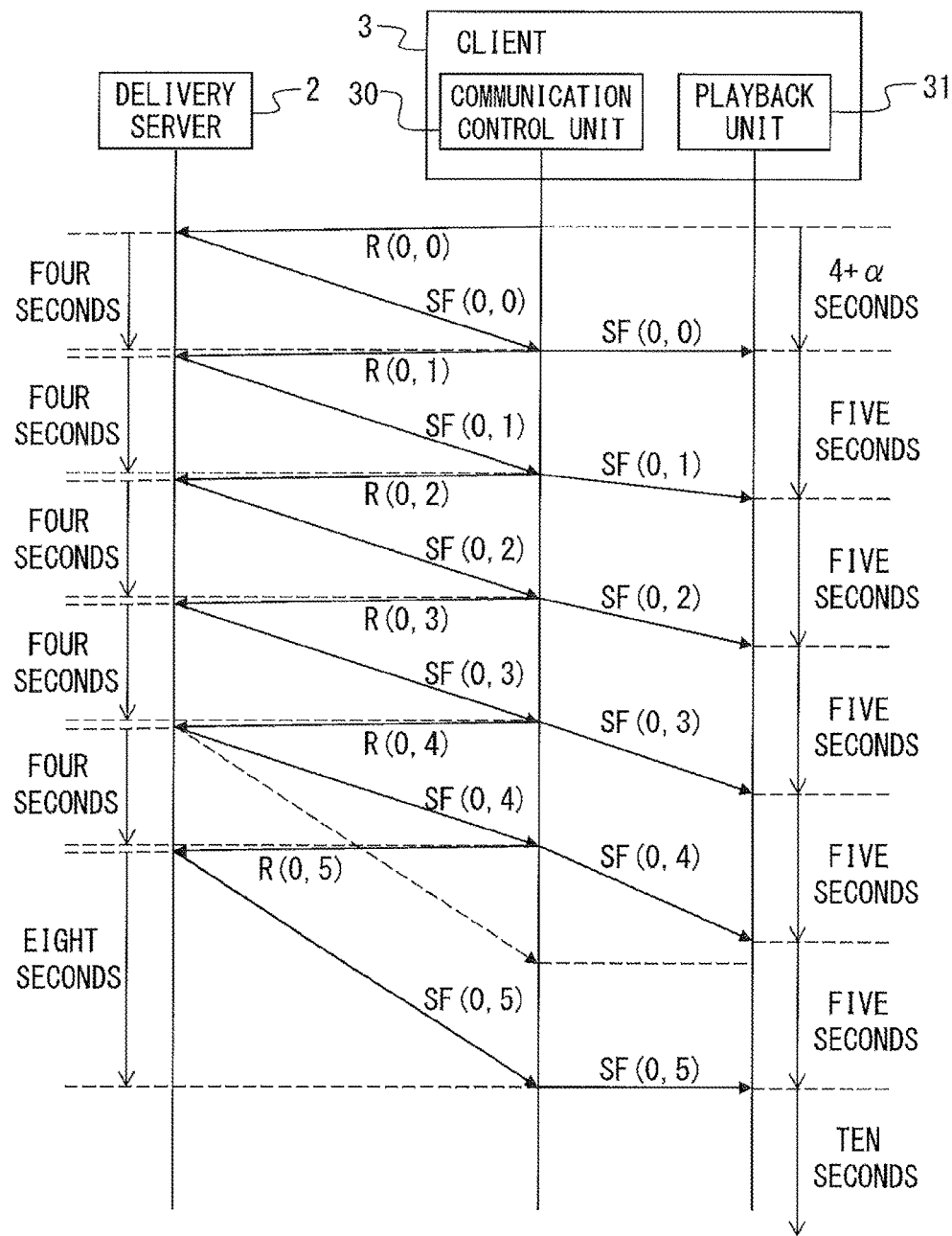
F I G. 8

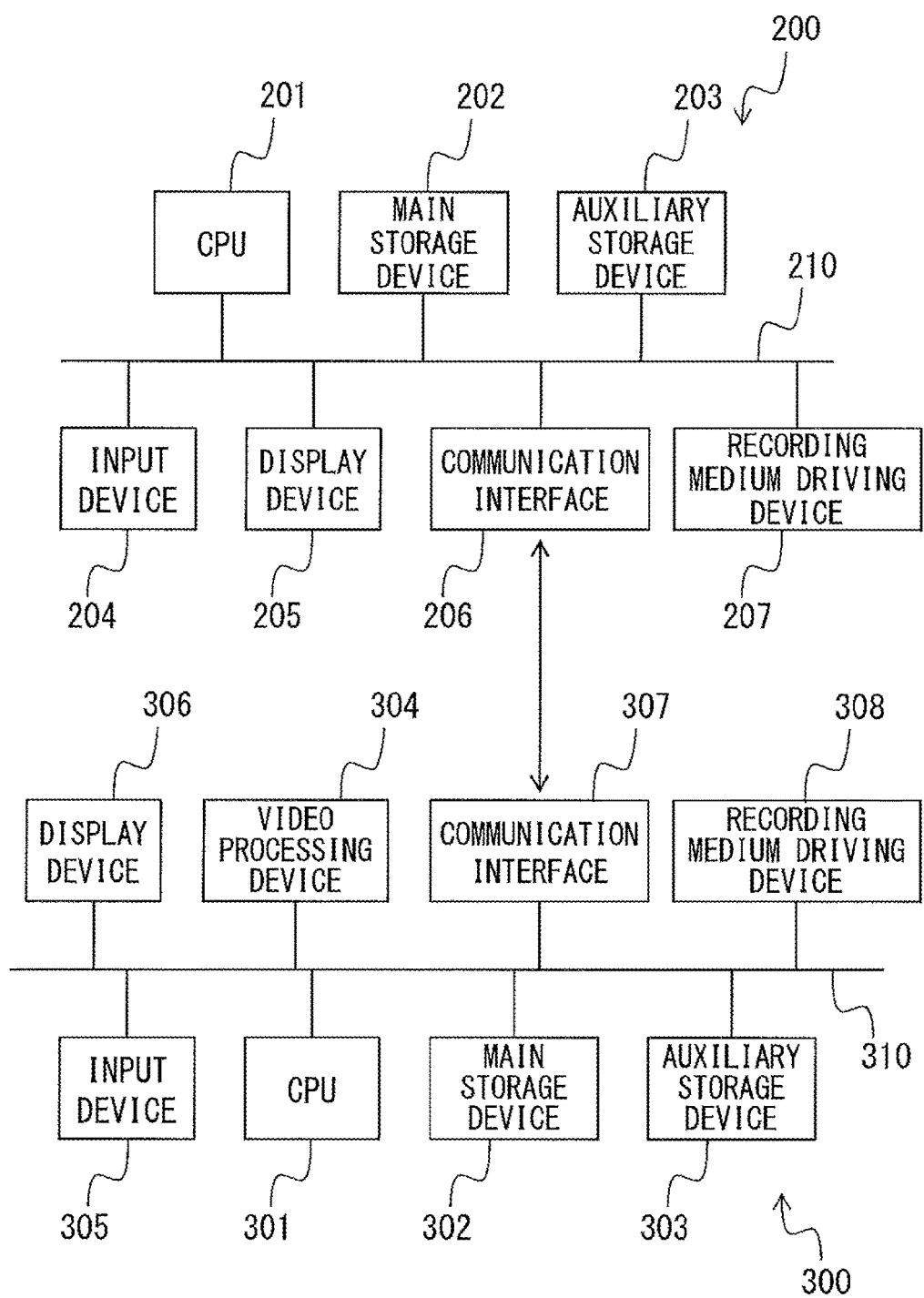
F I G. 9

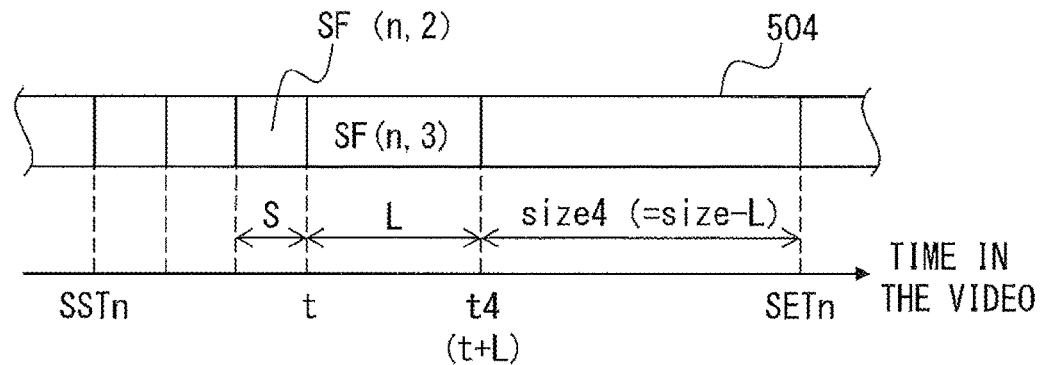
F I G. 1 2 D
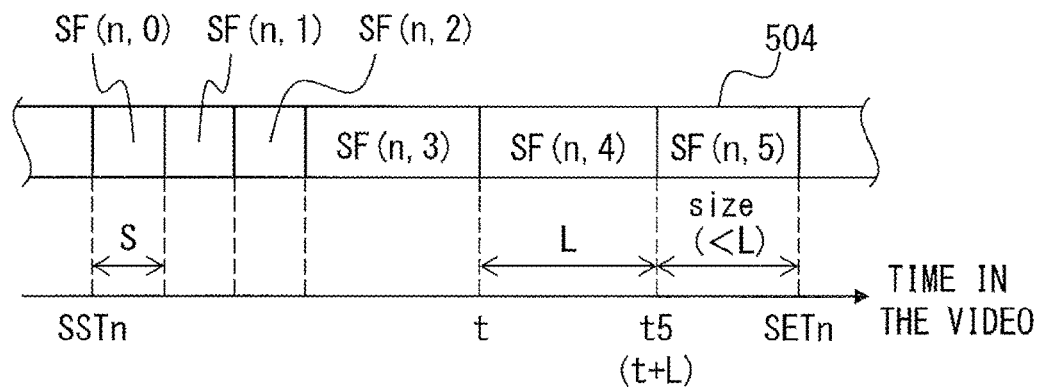
F I G. 1 2 E

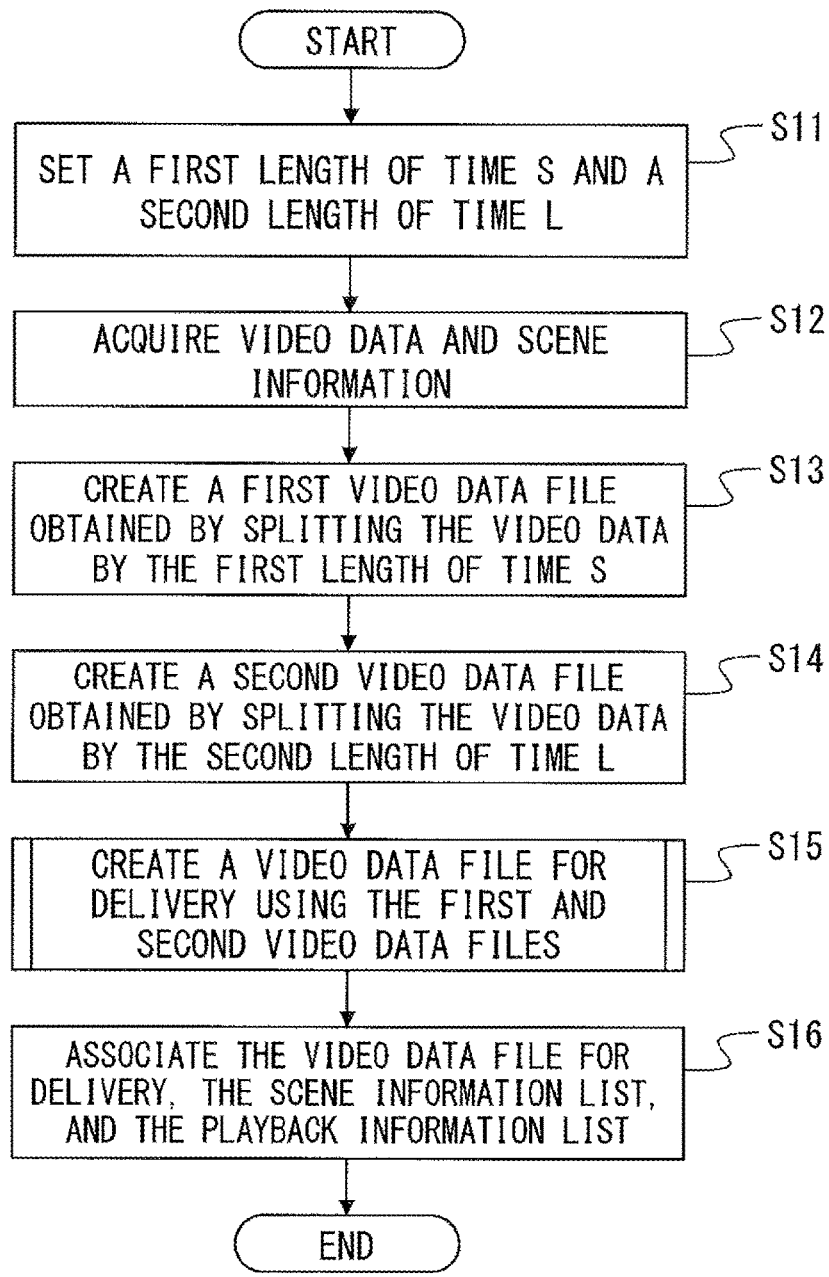
F I G. 1 3 A

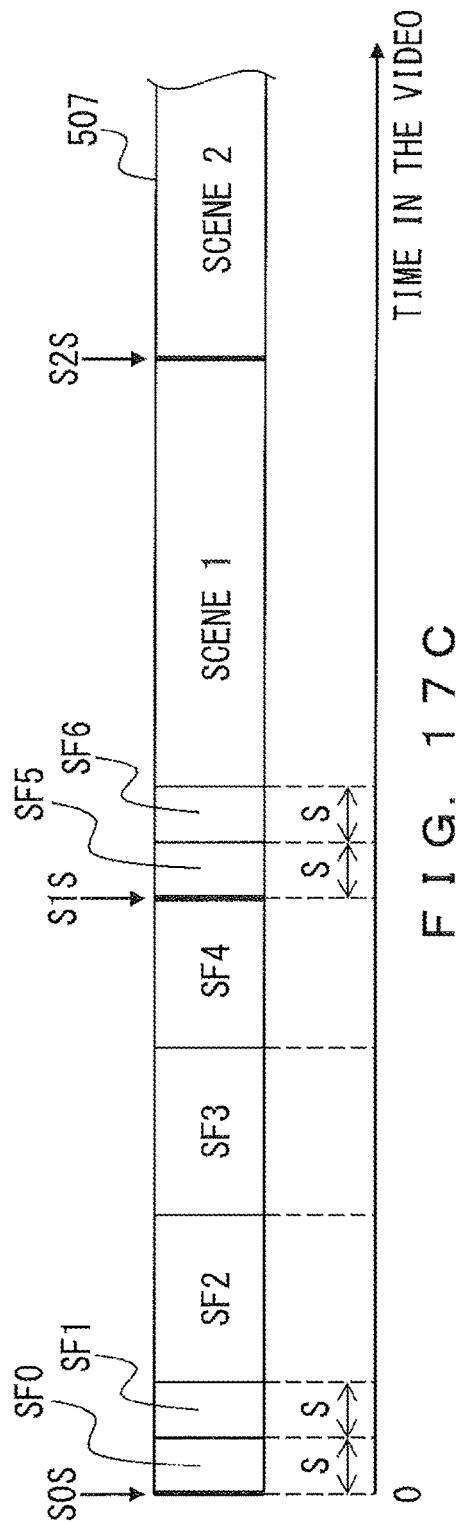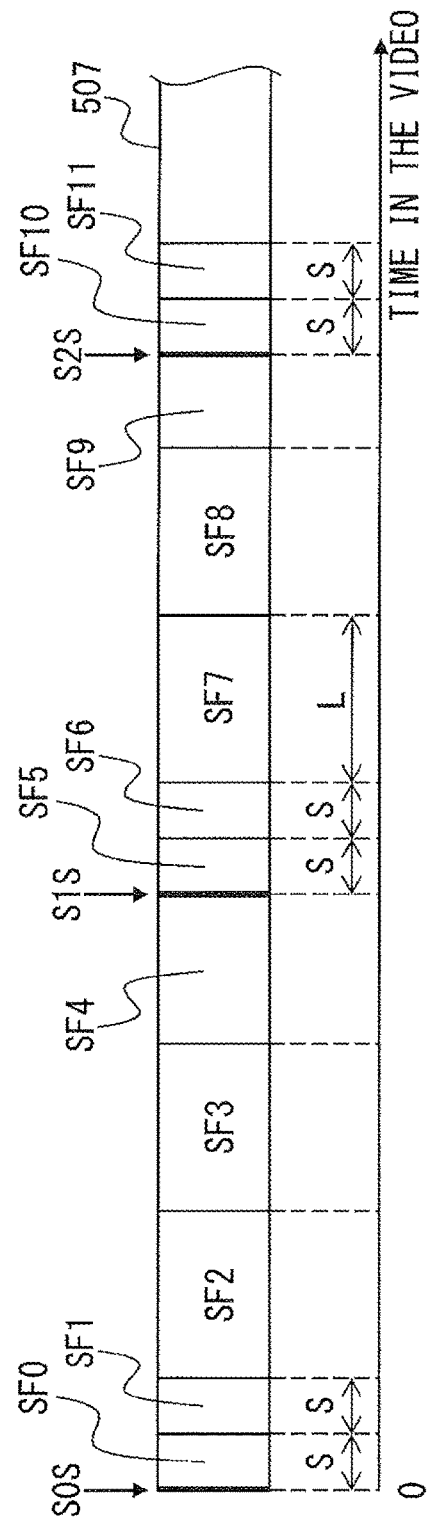

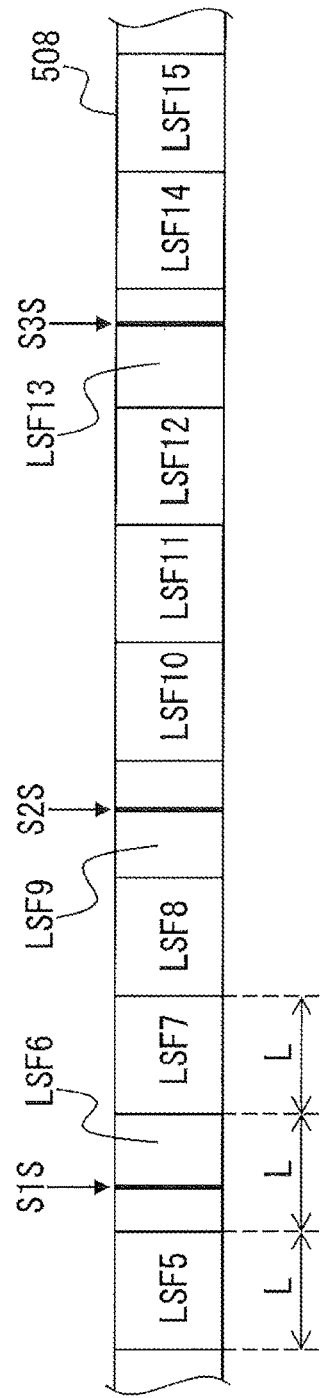
F I G. 18 A
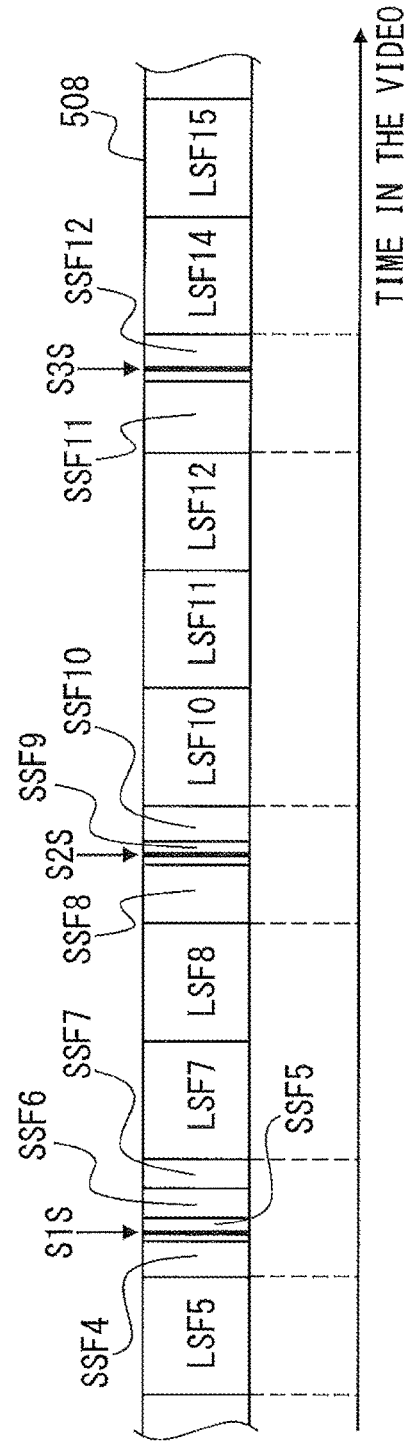
F I G. 18 B

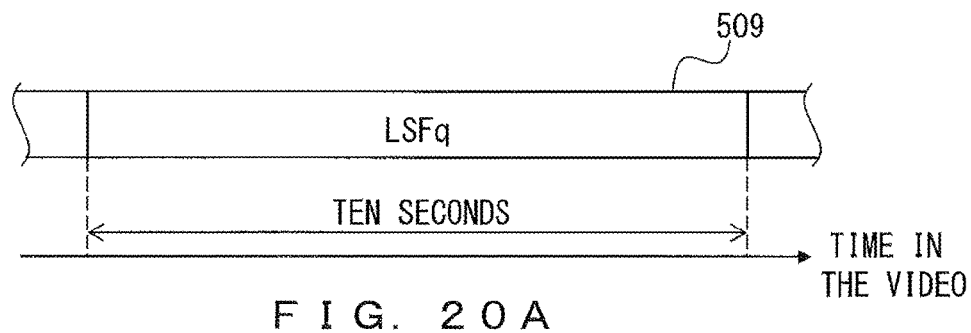
F I G. 20A
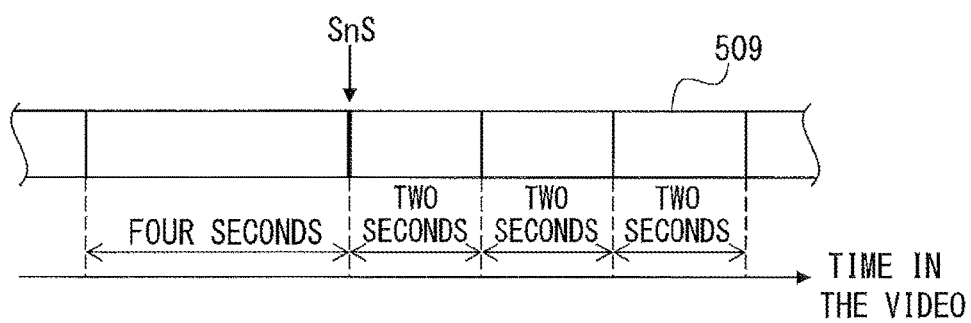
F I G. 20B
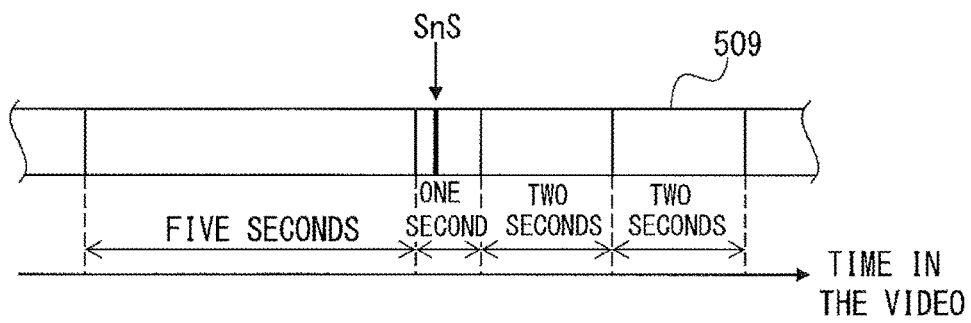
F I G. 20C

| TIME PERIOD ΔT FROM THE BEGINNING OF THE FILE TO THE BEGINNING OF THE SCENE (SECOND:FRAME) | SPLIT PATTERN |
|---|---|
| 0:00 ≤ ΔT ≤ 0:29 | 3 : 3 : 4 |
| 1:00 ≤ ΔT ≤ 1:29 | 1 : 3 : 3 : 3 |
| 2:00 ≤ ΔT ≤ 2:29 | 2 : 4 : 4 |
| 3:00 ≤ ΔT ≤ 3:29 | 3 : 3 : 4 |
| ⋮ | ⋮ |

FIG. 21

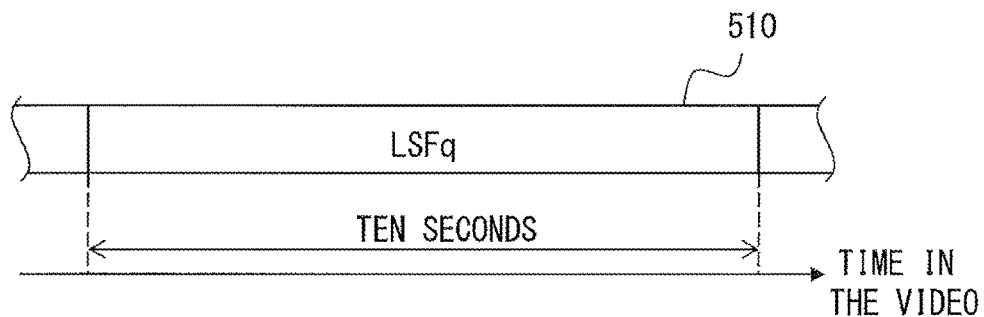
F I G. 2 2 A
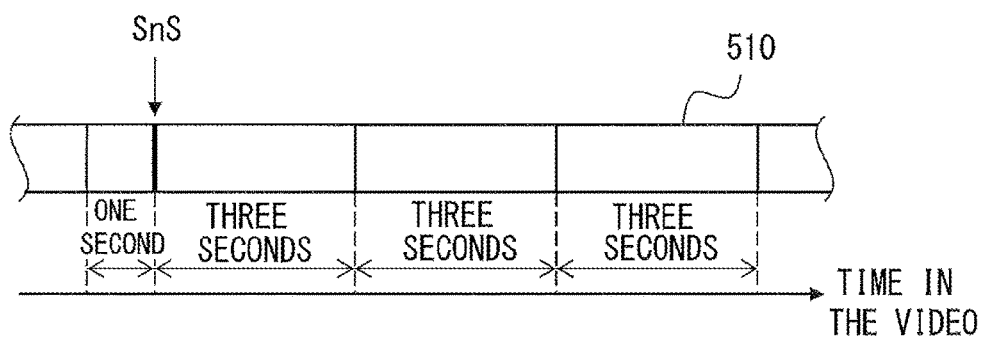
F I G. 2 2 B
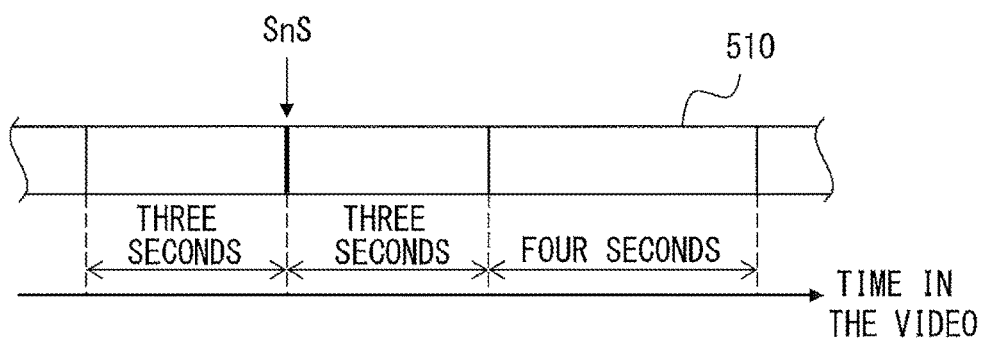
F I G. 2 2 C

VIDEO TRANSMISSION METHOD AND VIDEO TRANSMISSION APPARATUS

CROSS-REFERENCE TO RELATED APPLICATION

This application is based upon and claims the benefit of priority of the prior Japanese Patent Application No. 2015-007282, filed on Jan. 16, 2015, the entire contents of which are incorporated herein by reference.

FIELD

The embodiments discussed herein are related to a video transmission method and a video transmission apparatus.

BACKGROUND

Streaming delivery is one of the methods for delivering video via a communication network such as the Internet. With streaming delivery, one video data file is split into a plurality of segment files (split files), and these are sequentially delivered to a terminal (client) that play backs video data. The client sequentially plays back the received split files in chronological order.

Streaming delivery is broadly classified into a delivery method that uses a specific protocol such as a real-time streaming protocol (RTSP) and a delivery method that uses a hypertext transfer protocol (HTTP).

The streaming method that uses HTTP permits, for example, delivery of video with a web server alone. Further, streaming delivery that uses HTTP permits use of a cache, which results in reducing the load of a delivery server (web server). As a result, in recent years, streaming delivery services that use HTTP have been attracting attention and increasing in number.

An HTTP live stream (HLS) and MPEG-dynamic adaptive streaming over HTTP (MPEG-DASH) are examples of standards for streaming delivery that uses HTTP.

When the streaming delivery described above is performed, the client starts a playback after completing a reception of a segment file including a frame that is the beginning of video data or the beginning of a designated scene. Thus, there are a few seconds of waiting time before the playback starts in the client after a user selects video data or a scene which he/she wants to have delivered.

When splitting video data into a plurality of segment files, the split is performed by partitioning the video data, for example, for each predetermined length of time from the beginning of the video data. For HLS and MPEG-DASH, video data is partitioned into segment files whose length of time (playback time) is, for example, about ten seconds.

For example, when the playback time for one segment file is ten seconds and the transfer time of the segment file is twice the playback rate, it takes five seconds to receive the segment file. Thus, the waiting time in the client is five seconds. While this waiting time can be reduced by shortening the length of time (playback time) of each segment file, there is an increase in the load of the delivery server because there is an increase in the number of segment files and the number of communications between the client and the delivery server is increased.

The technology that is disclosed in the following document is known.

Patent Document 1: Japanese Laid-open Patent Publication No. 2013-089977

SUMMARY

According to an aspect of the embodiment, a video transmission method includes causing a processor to execute a process including making a length of time corresponding to each video data file in a predetermined number of data files shorter than a length of time corresponding to the video data file to be transmitted next after the transmission of the predetermined number of video data files, wherein the predetermined number of video data files include the video data file to be first transmitted and are sequentially transmitted when sequentially transmitting video data files to the video playback device.

The object and advantages of the embodiments will be realized and attained by means of the elements and combinations particularly pointed out in the claims.

It is to be understood that both the foregoing general description and the following detailed description are exemplary and explanatory and are not restrictive of the embodiments.

BRIEF DESCRIPTION OF DRAWINGS

FIG. 1 is a block diagram that illustrates an example of a video delivery system according to a first embodiment.

FIG. 2B is a table that illustrates an example of a video scene information list.

FIG. 2C is a table that illustrates an example of a video playback information list.

FIG. 3B is an example of a scene selection screen displayed to the client.

FIG. 8 is a sequence diagram that illustrates another example of a procedure of delivering a split file.

FIG. 9 illustrates examples of hardware configurations of a delivery server and a client.

FIG. 12D is a diagram (Part 4) that illustrates a process of creating a split file when M=3.

FIG. 12E is a diagram (Part 5) that illustrates a process of creating a split file when M=3.

FIG. 13A is a flowchart that illustrates a second example of a method for creating a video data file.

FIG. 17C is a diagram (Part 3) that illustrates a specific example with respect to the third example of a method for creating a video data file.

FIG. 17D is a diagram (Part 4) that illustrates a specific example with respect to the third example of a method for creating a video data file.

FIG. 18A is a diagram (Part 1) that illustrates a fourth example of a method for creating a video data file.

FIG. 18B is a diagram (Part 2) that illustrates a fourth example of a method for creating a video data file.

FIG. 20A is a diagram (Part 1) that illustrates another method for re-splitting a split file in the fourth example.

FIG. 20B is a diagram (Part 2) that illustrates another method for re-splitting a split file in the fourth example.

FIG. 20C is a diagram (Part 3) that illustrates another method for re-splitting a split file in the fourth example.

FIG. 21 is a table that illustrates yet another method for re-splitting a split file in the fourth example.

FIG. 22A is a diagram (Part 1) that illustrates an example of re-splitting by use of previously provided split patterns.

FIG. 22B is a diagram (Part 2) that illustrates an example of re-splitting by use of previously provided split patterns.

FIG. 22C is a diagram (Part 3) that illustrates an example of re-splitting by use of previously provided split patterns.

DESCRIPTION OF EMBODIMENTS

Figure 2A:
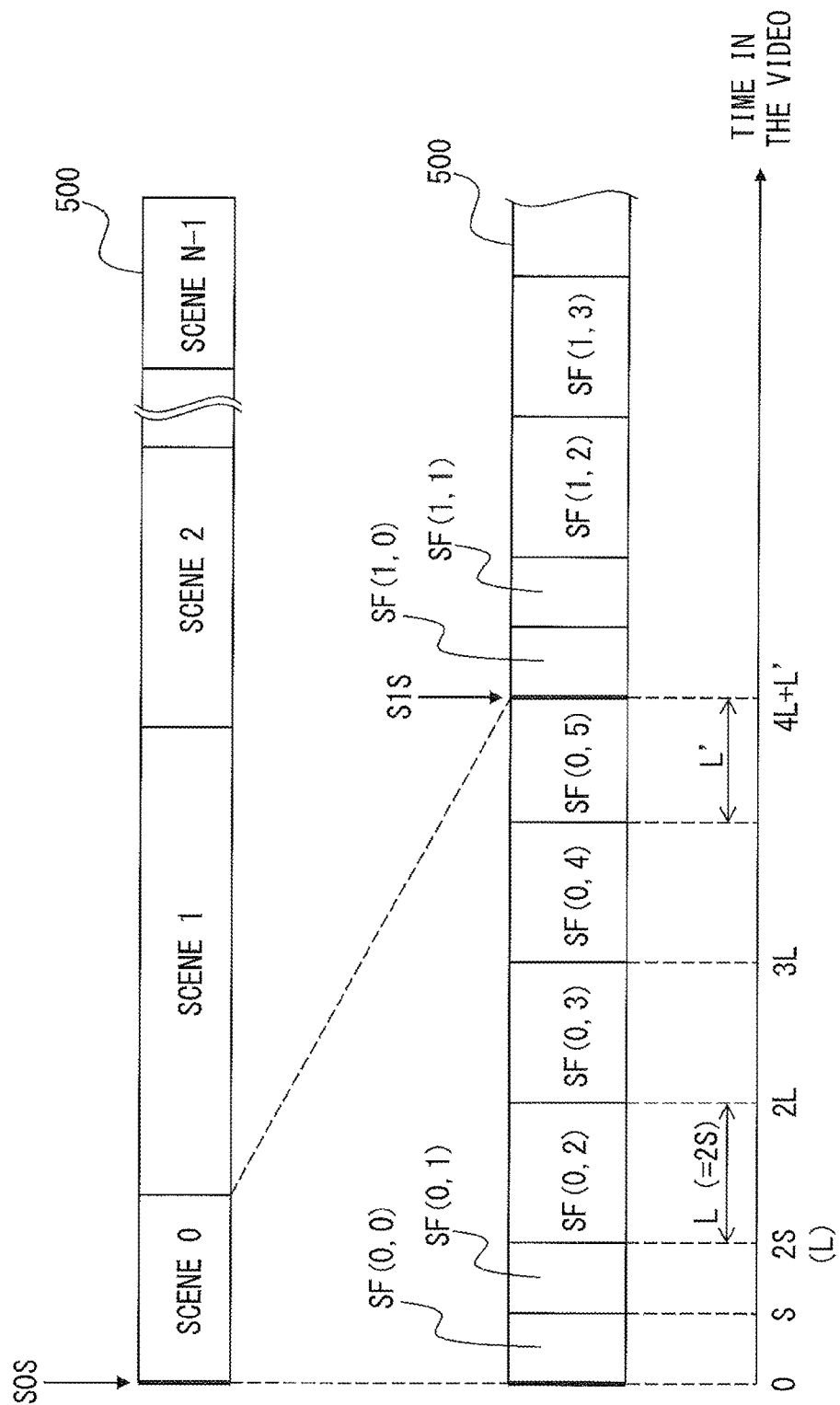
FIG. 2A is a diagram that illustrates a first example of a video data file.

Preferred embodiments of the present invention will be explained with reference to accompanying drawings.

<First Embodiment>

FIG. 1 is a block diagram that illustrates an example of a video delivery system according to a first embodiment. In FIG. 1, a video delivery system 1 includes a delivery server 2 and a plurality of clients 3. The delivery server 2 and the client 3 are communicatively connected via a communication network 4.

The delivery server 2 includes a storage 20 and a control unit 21. The storage 20 has stored therein, for example, a plurality of split video data files obtained by splitting a video data file as a video data file for delivery, and a playback information list and a scene information list of the video data file. The split video data file will be hereinafter referred to as "split file" or "segment file".

The client 3 is a terminal (video playback device) that is able to perform communication via the communication network 4, and to play back and display video.

It is sufficient if the configurations of the delivery server 2 and the client 3 in the video delivery system 1 according to the present embodiment are any of the configurations of a delivery server and a client for existing streaming delivery.

A video data file in the video delivery system 1 according to the present embodiment is split so as to shorten the waiting time until playback starts in the client 3. Examples of a video data file and a delivery method according to the present embodiment will now be described.

FIG. 2A is a diagram that illustrates a first example of a video data file. FIG. 2B is a table that illustrates an example of a video scene information list. FIG. 2C is a table that illustrates an example of a video playback information list.

A video data file 500 held by the delivery server 2 is split into, for example, N scenes from scene 0 to scene N−1, as illustrated in the upper portion of FIG. 2A. Further, each of the scenes in the video data file 500 is split into a plurality of split files SF (n,m), as illustrated in the lower portion of FIG. 2A. In a split file SF (n,m), n represents a scene number, and m represents an identification number for the split file in a scene.

In the first example of a video data file, the length of time (playback time) of SF (n,0) and SF (n,1) that are the first two split files from each beginning scene S0S, S1S is a first length of time S. Further, a portion after time 2S in each scene is split into split files having a second length of time L that is twice as long as the first length of time S. A length of time L' of the last split file in the scene is not longer than the second length of time L.

For example, a scene information list and a playback information list are associated with the video data file 500. The scene information list is a list of scene information including a scene No. and a start time in a video, as illustrated in FIG. 2B. The playback information list is a list of playback information including a file name and a playback time of a split file, as illustrated in FIG. 2C.

Figure 3A:
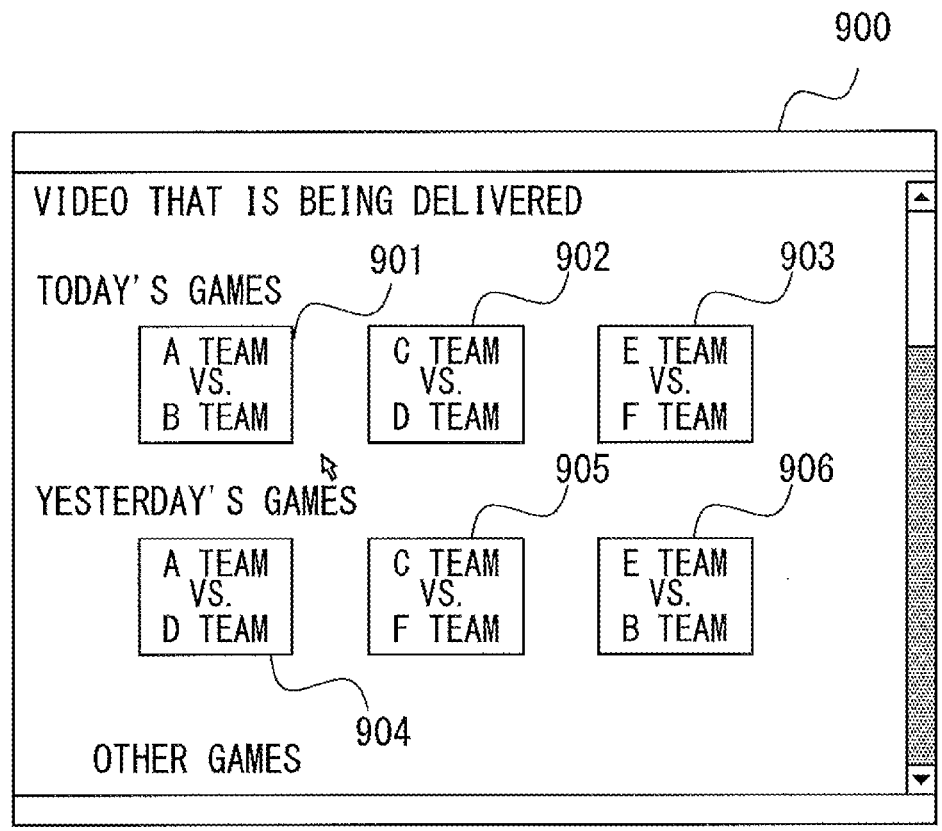
FIG. 3A is an example of a video selection screen displayed to a client.
Figure 3C:
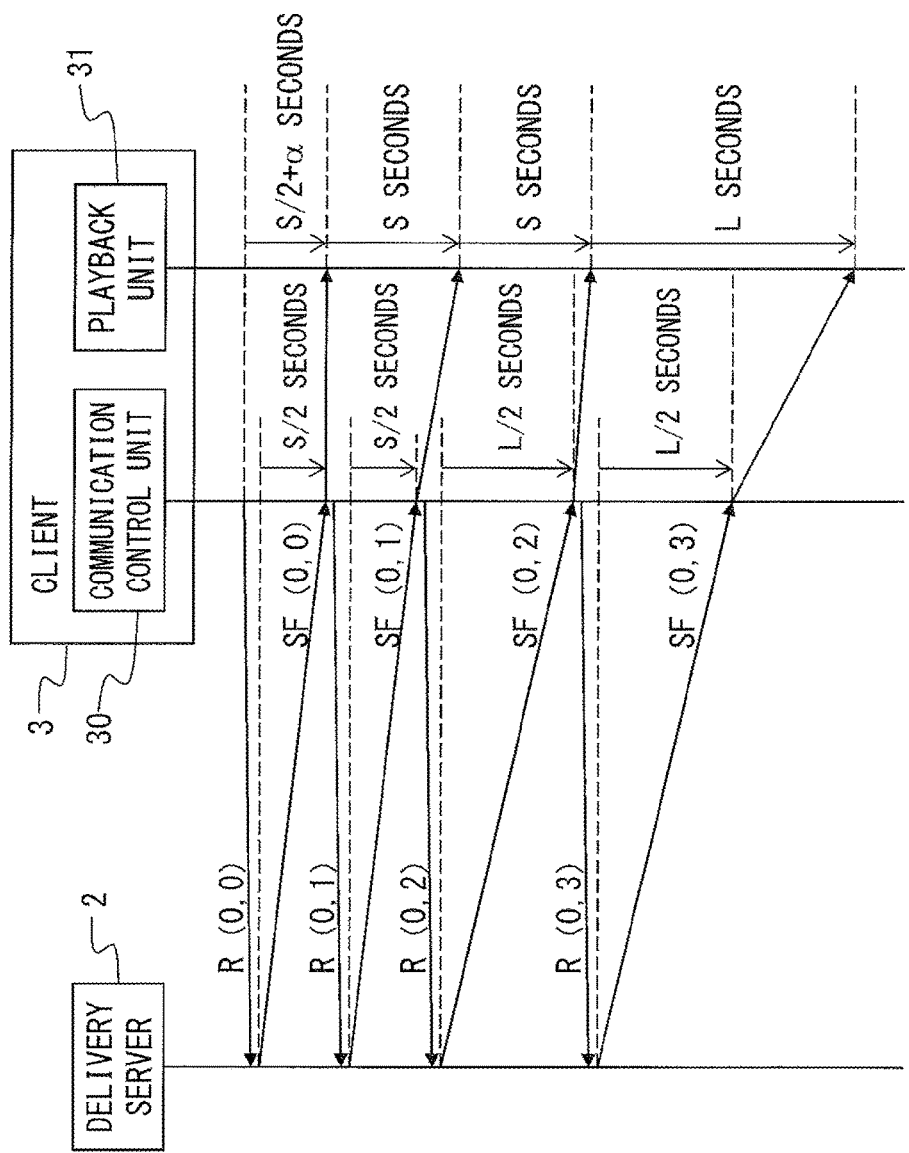
FIG. 3C is a sequence diagram that illustrates a procedure of delivering a split file.

FIG. 3A is an example of a video selection screen displayed to a client. FIG. 3B is an example of a scene selection screen displayed to the client. FIG. 3C is a sequence diagram that illustrates a procedure of delivering a split file.

In this case, take a video of a baseball game as an example of the video delivered by the delivery server 2. When the client 3 accesses the delivery server 2 according to a predetermined operation by a user, for example, a video selection screen 900, as illustrated in FIG. 3A, is displayed on a display unit of the client 3. On the video selection screen 900, thumbnails 901 to 906 of videos that are being delivered are displayed.

When the user of the client 3 operates an input device such as a mouse or a touch panel in a state in which the video selection screen 900 is being displayed, for example, a scene selection screen 910 as illustrated in FIG. 3B is displayed on the display unit of the client 3. On the scene selection screen 910, information 911 on a selected video (game), a scene selection part 912, and a player screen 913 that displays the video are displayed. For example, in the scene selection part 912, a thumbnail of a frame at the beginning of each scene (inning), for example, 912a to 912c, 912m, or 912n, is displayed as information indicating a playback point that can be designated as a playback starting point. The thumbnail is associated with the scene information list, and a scene to be played back (playback starting point) is designated by selecting and designating a thumbnail. The beginning of a scene of video data (split file) is not restricted to the start of an inning, and this maybe a playback point that includes common predetermined features such as the start of a pitching motion of a pitcher. Further, the beginning of a scene of video data such as the start of an inning and the start of a pitching motion of a pitcher may be identified on the basis of, for example, features of images included in the video data that are acquired as a result of performing image analysis on the video data.

When the user of the client 3 operates the input device in a state in which the scene selection screen 910 is being displayed, the client 3 starts receiving and playing back the split files of the selected scene.

When the user selects a scene, a communication control unit 30 of the client 3 transmits, to the delivery server 2, a request signal R (0,0) that makes a request for a first split file SF (0,0) of the selected scene, as illustrated in FIG. 3C. The delivery server 2 that has received the request signal R (0,0) delivers (transfers) the requested split file SF (0,0) from the storage 20 to the client 3. When the communication control unit 30 of the client 3 completes the reception of the split file SF (0,0), it causes a playback unit 31 to start playing back the split file SF (0,0).

Further, when the communication control unit 30 of the client 3 completes the reception of the split file SF (0,0), it transmits a request signal R (0,1) that makes a request for the next split file SF (0,1). Then, the client 3 completes the reception of the split file SF (0,1), and starts playing back the split file SF (0,1) at the same time as the finish of the playback of the split file SF (0,0).

After that, the client 3 continues to receive a split file SF by transmitting a request signal R that makes a request for the next split file SF every time it completes the reception of a split file SF, and continues to play back the received split file SF.

When the transfer rate of a split file is twice the playback rate, it takes S/2 seconds to complete the transfer of the first split file SF (0,0). Thus, the waiting time from when the user selects a scene until the playback of the scene starts is S/2+α seconds. Here, α is a very short time that is less than one second, so a substantive waiting time is S/2 seconds. Thus, when the first length of time S is five seconds, the waiting time is 2.5 seconds.

Further, it also takes 2.5 seconds from the completion of the transfer of the first split file SF (0,0) to the completion of the transfer of the next split file SF (0,1). On the other hand, the playback time of the first split file SF (0,0) is five seconds. In other words, it takes about 2.5 seconds from the completion of the transfer of the split file SF (0,1) to the start of its playback. Thus, it takes about 7.5 seconds from the completion of the transfer of the split file SF (0,1) to the finish of the playback of the split file SF (0,1).

After the transfer of the split files SF (0,0) and SF (0,1) is completed, a split file SF (0,2) having a second length of time L is transferred to the client 3. As described above, the second length of time L is twice as long as the first length of time S. Thus, when the first length of time S is five seconds, the second length of time is 10 seconds. Accordingly, when the transfer rate is twice the playback rate, the time needed to transfer the split file SF (0,2) is five seconds. Therefore, at the time when the transfer of the split file SF (0,2) is completed, the client 3 is still playing back the split file SF (0,1), and it is possible to start playing back the split file SF (0,2) at the same time as the finish of the playback of the split file SF (0,1). This prevents the occurrence of a waiting time when the length of time of a split file is long.

As described above, when delivering the video data illustrated in FIG. 2A, the delivery server 2 plays back the video data by transferring, to the client 3 twice, a split file having a first length of time S that is shorter than a second length of time L at the start of transferring a split file. This permits the client 3 to shorten the waiting time until the playback of the video data starts.

Further, it is possible to suppress an increase in the number of communications between the delivery server 2 and the client 3 because a third or greater split file has a second length of time L. As a result, it is possible to suppress an increase in the load of the delivery server 2 caused by an increase in the number of communications with the client 3.

Figure 4:
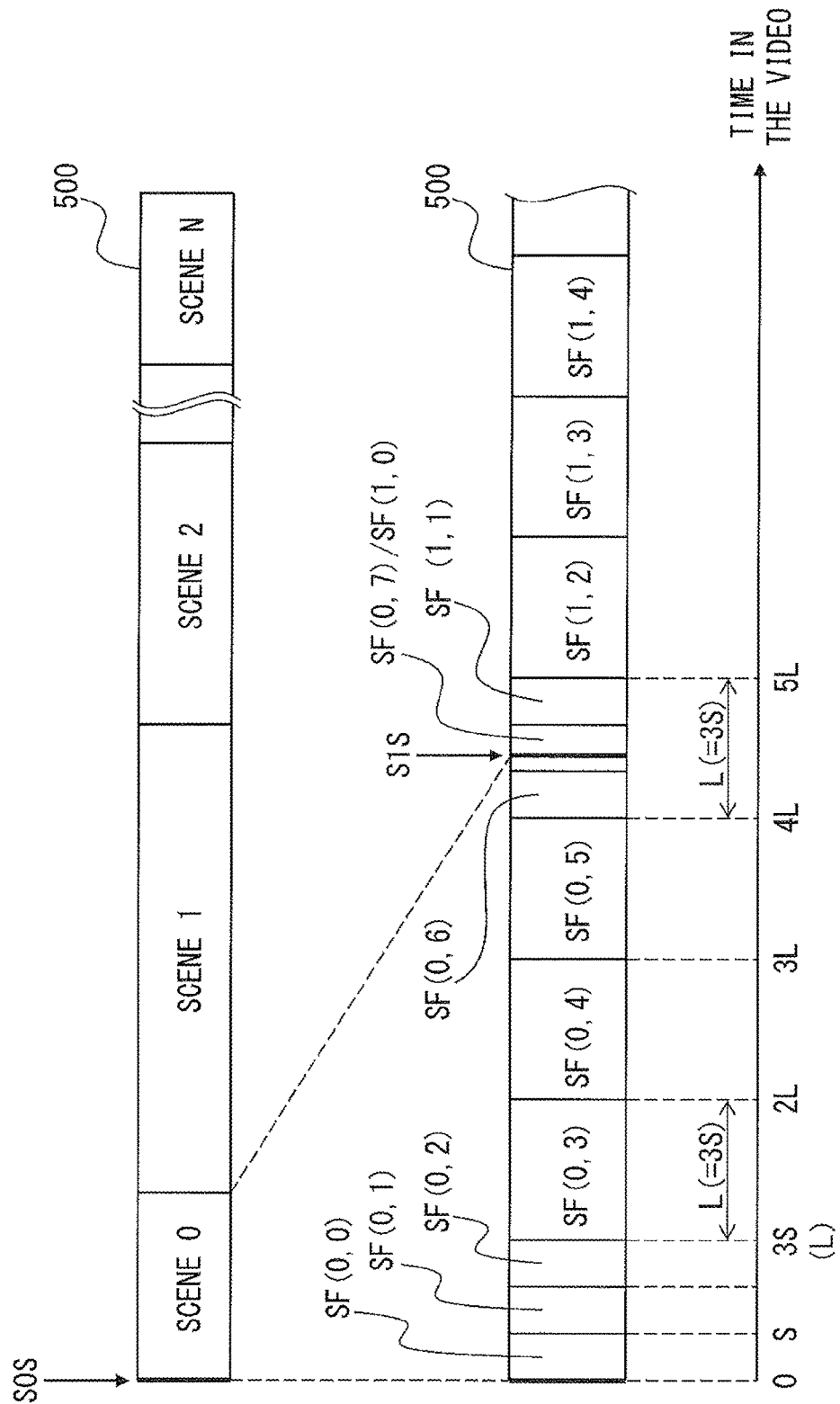
FIG. 4 is a diagram that illustrates a second example of a video data file.

FIG. 4 is a diagram that illustrates a second example of a video data file. When splitting a video data file 500 into a plurality of split files, for example, as illustrated in FIG. 4, the video data file 500 may be split by the second length of time at regular intervals from the beginning of video data and then a section that includes a frame at the beginning of a scene may further be split by the first length of time S.

As described above, when splitting the video data file 500, from the beginning, by the second length of time at regular intervals regardless of a point of switching the scene, there is a possibility that a frame at the beginning of scene 1 S1S is not consistent with a partition point of a split file, as illustrated in the lower portion of FIG. 4. In this case, a split file including the frame at the beginning of scene 1 S1S is the last split file SF (0,7) of scene 0 and also the first split file SF (1,0) of scene 1, the next scene. A delivery method when delivering such a video data file 500 will be described with reference to FIGS. 5A and 5B.

Figure 5A:
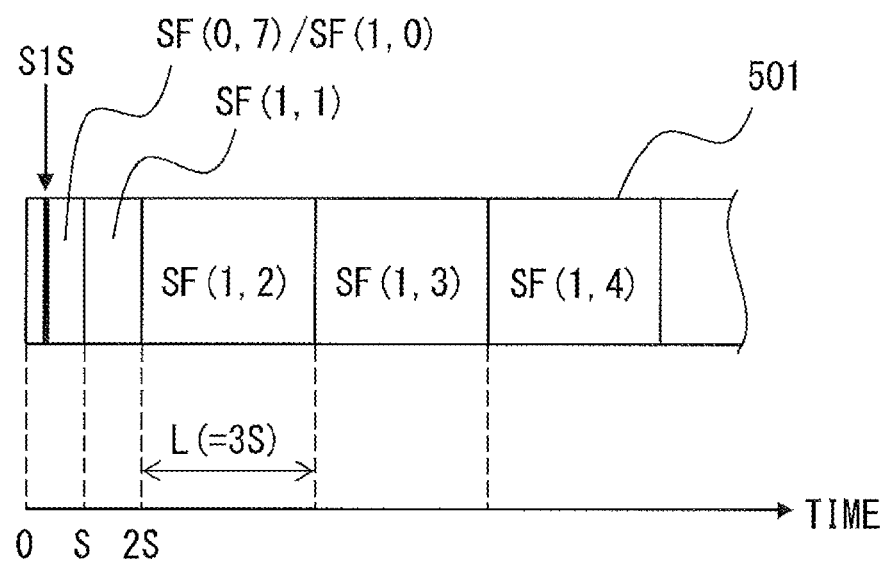
FIG. 5A is a diagram that illustrates a delivery method when delivering the video data file of FIG. 4 starting with scene 1.
Figure 5B:
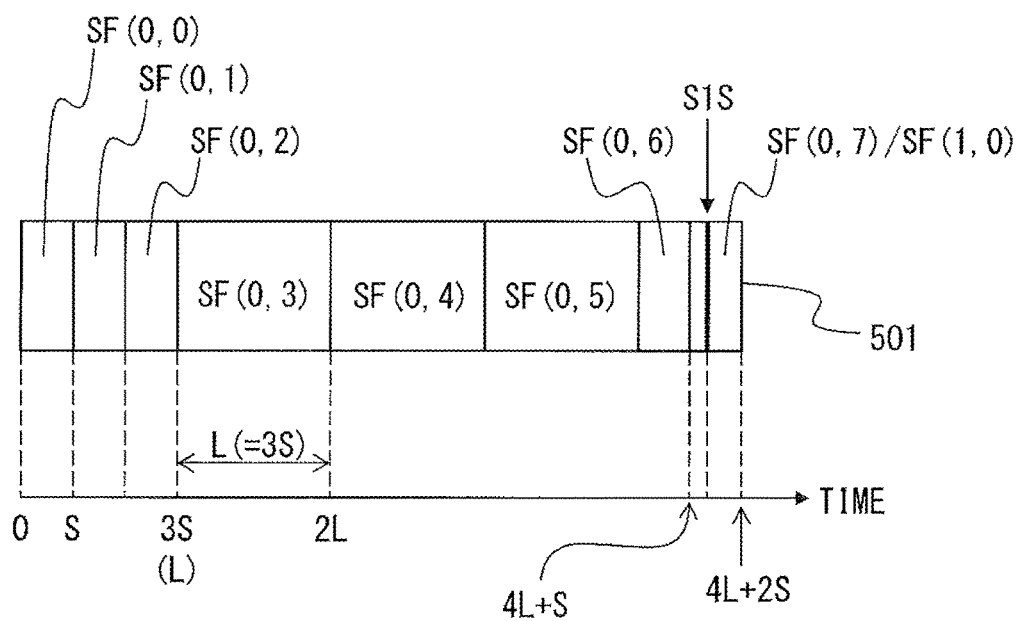
FIG. 5B is a diagram that illustrates a delivery method when only delivering scene 0 of the video data file of FIG. 4.

FIG. 5A is a diagram that illustrates a delivery method when delivering the video data file of FIG. 4 starting with scene 1. FIG. 5B is a diagram that illustrates a delivery method when only delivering scene 0 of the video data file of FIG. 4.

When delivering a video data file, data is transferred split-file by split-file. Thus, when delivering the video data file of FIG. 4 starting with scene 1, for example, first, the split file SF (0,7)/SF (1,0) including the frame at the beginning of scene 1 S1S is transferred, as illustrated in FIG. 5A. Therefore, a video data file 501 that has been transferred to the client 3 starts from the beginning of the split file SF (0,7)/SF (1,0). As a result, in this case, the end of the previous scene is displayed just after the playback of the video data file 501 starts.

Further, when only delivering scene 0 of the video data file of FIG. 4, the split file SF (0,7)/SF (1,0) including the frame at the beginning of scene 1 S1S is transferred at the end, as illustrated in FIG. 5B. Also, in this case, when the client 3 plays back the transferred video data file 501, the beginning of the next scene included in the end of the split file SF (0,7)/SF (1,0) is displayed.

As described above, when there is a split file including portions of two scenes partitioned with a frame at the beginning of a scene, for example, a point of the beginning of the scene may be identified on the basis of a scene information list and a playback information list and may be associated with a video data file. Accordingly, when playing back, for example, the video data file 501 illustrated in FIG. 5A, it is possible to play back the video data file 501 from the starting point of scene 1, not from the beginning of the split file SF (0,7)/SF (1,0). Likewise, when playing back the video data file 501 illustrated in FIG. 5B, it is possible to finish the playback at the end of scene 0 (just before scene 1), not at the end of the split file SF (0,7)/SF (1,0).

Figure 6:
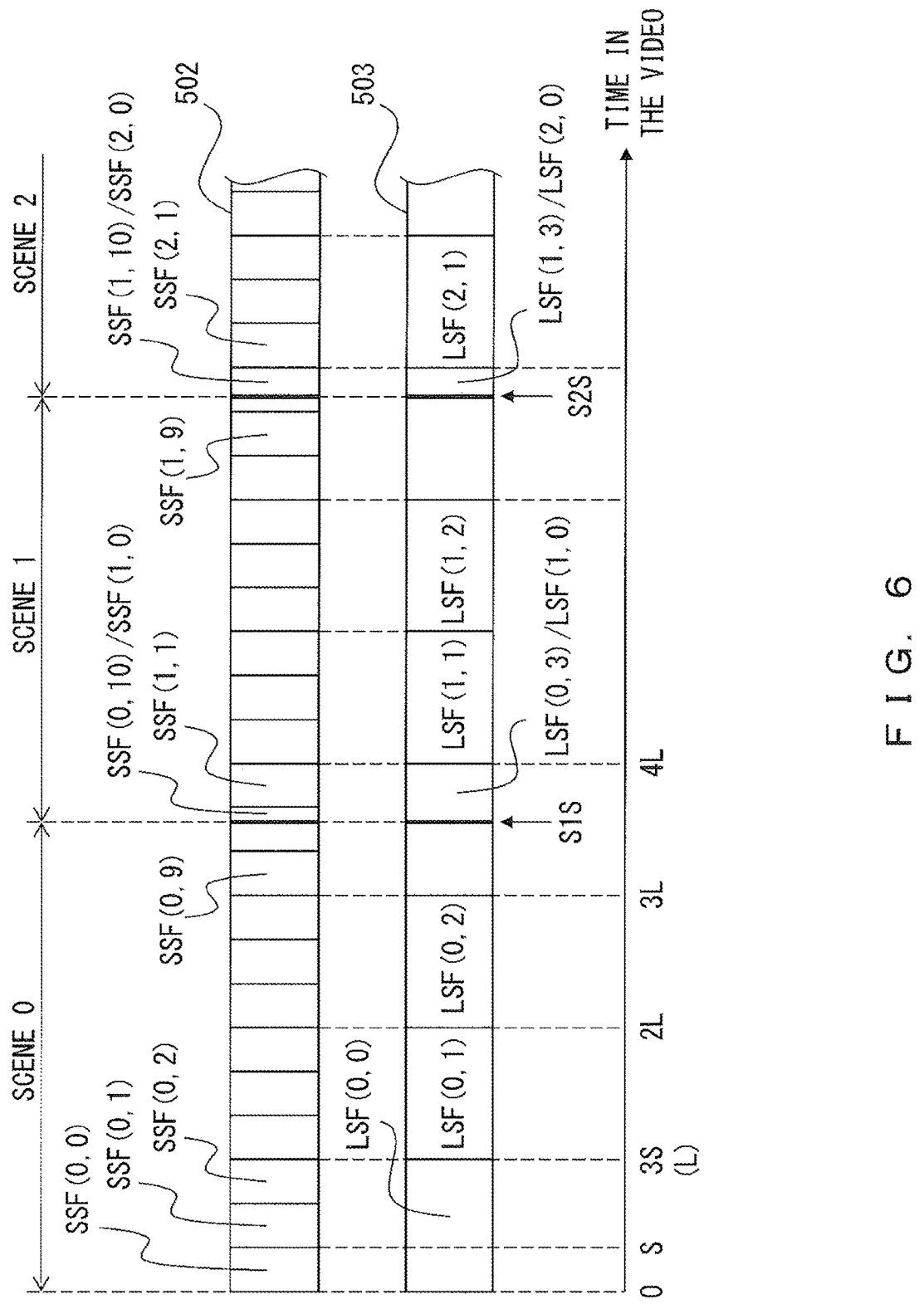
FIG. 6 is a diagram that illustrates a third example of a video data file.

FIG. 6 is a diagram that illustrates a third example of a video data file. As illustrated in FIG. 6, video data files that are to be held the delivery server 2 may be two data files, a first video data file 502 and a second video data file 503. The first video data file 502 is a data file created by splitting the entirety of the video data into split files SSF (n,m) having a first length of time S from the beginning of the video data. The second video data file 503 is a data file created by splitting the entirety of the video data into split files LSF (n,q) having a second length of time L from the beginning of the video data. The first and second video data files 502 and 503 have the same bitrate, and differ only in the length of time of a split file.

When providing two video data files whose split files have a different length of time from each other, the first length of time S is set as a divisor of the second length of time L. For example, the second length of time L is nine seconds, and the first length of time S is three seconds. This results in making the start time of a split file LSF in the second video data file 503 consistent with any start time of a split file SSF in the first video data file 502. A delivery method when delivering the video data files illustrated in FIG. 6 will be described with reference to FIGS. 7A to 7E.

Figure 7A:
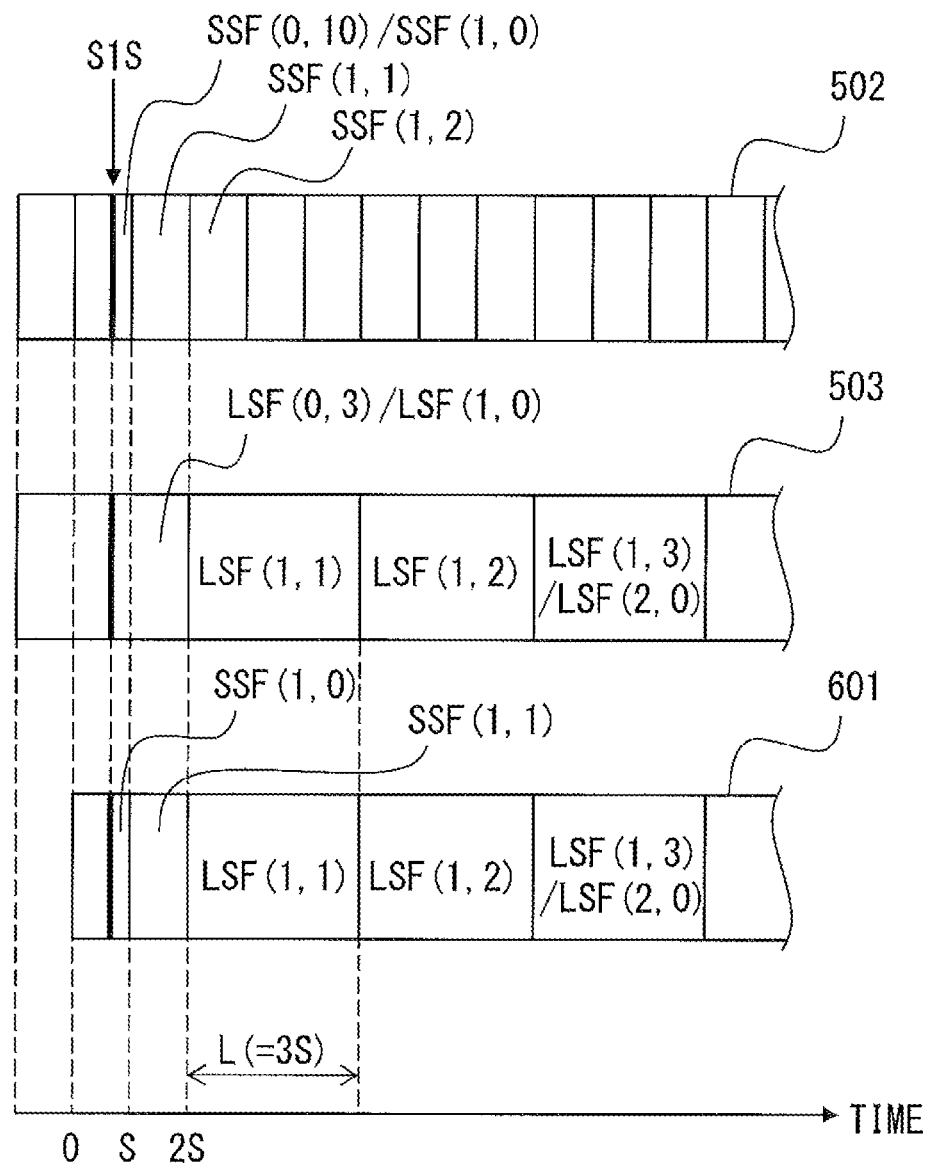
FIG. 7A is a diagram that illustrates a delivery method when delivering the video data file of FIG. 6 starting with scene 1.
Figure 7B:
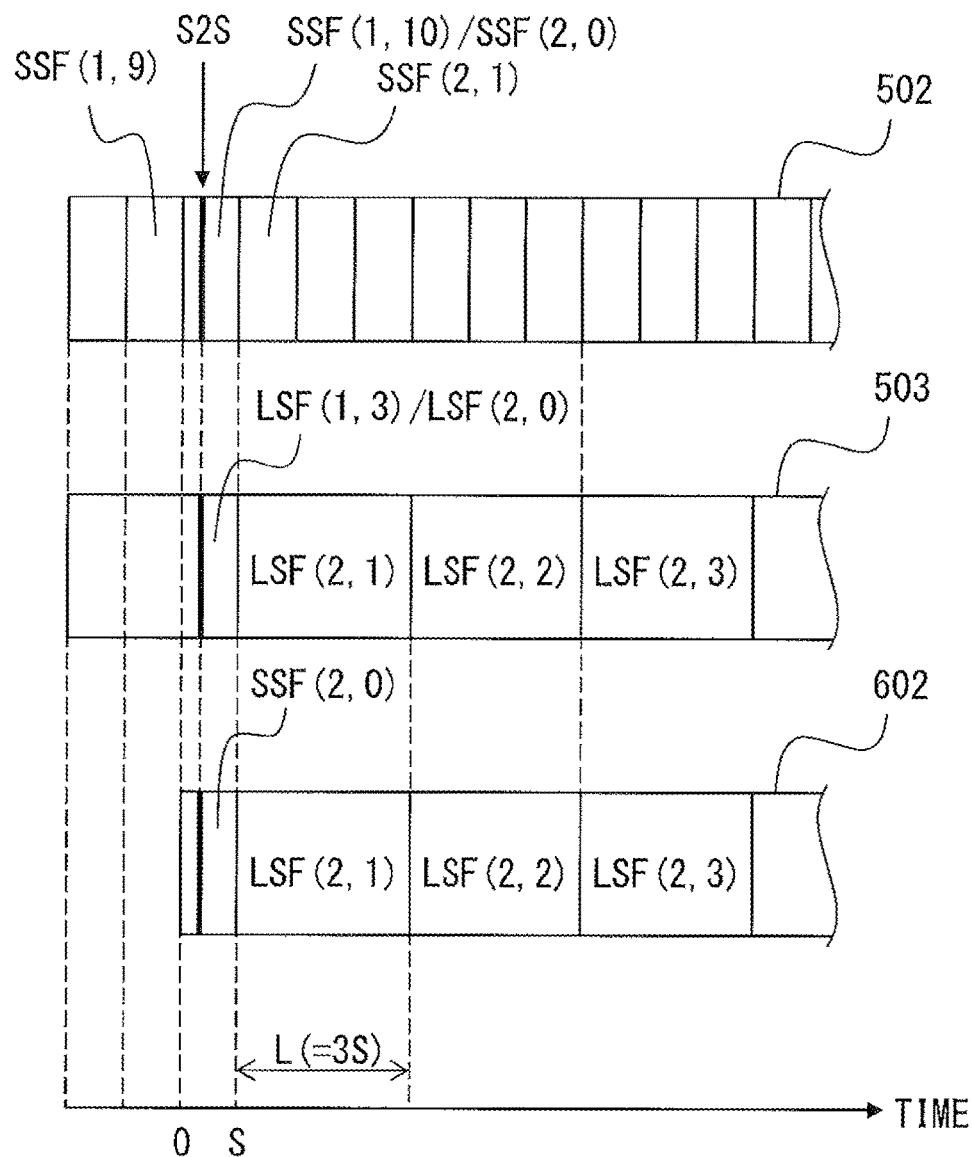
FIG. 7B is a diagram that illustrates a delivery method when delivering the video data file of FIG. 6 starting with scene 2.
Figure 7C:
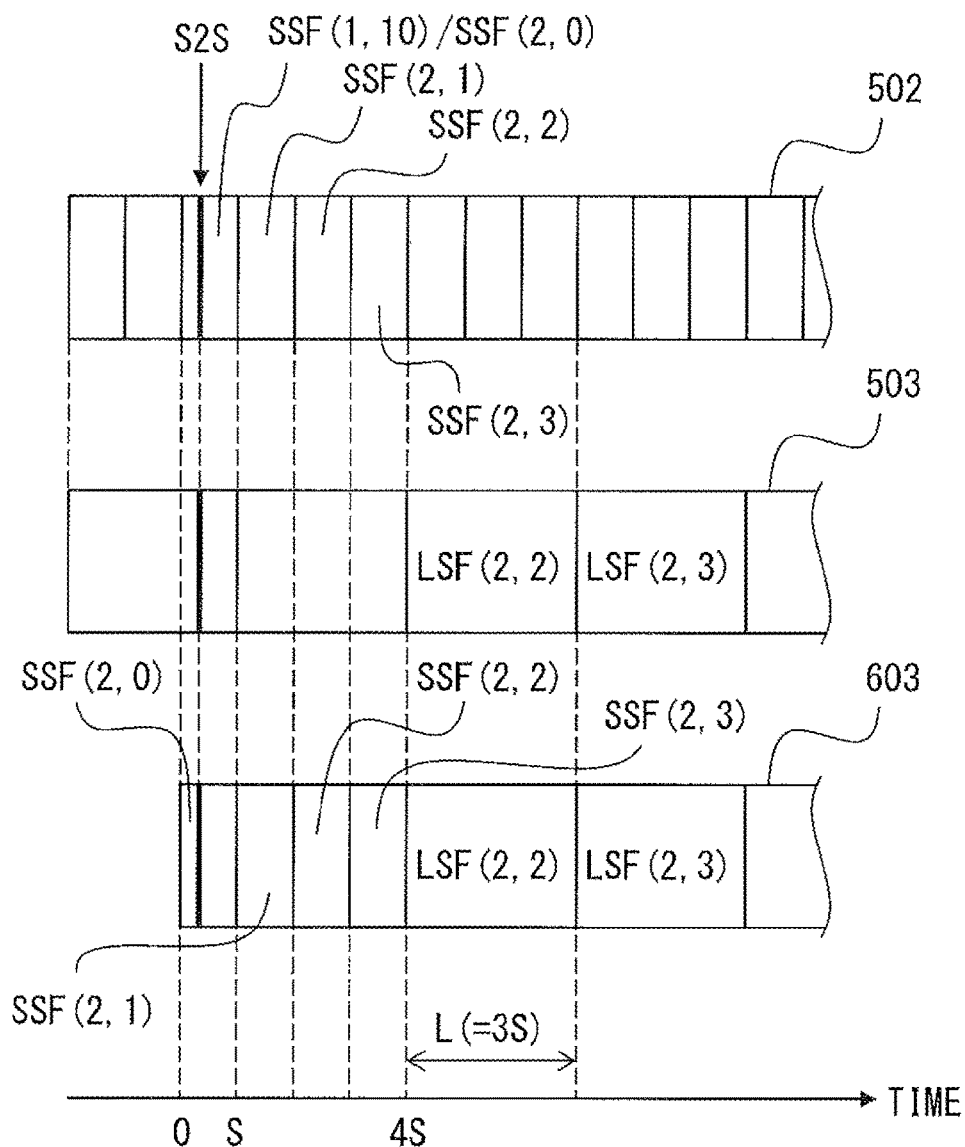
FIG. 7C is a diagram that illustrates another delivery method when delivering the video data file of FIG. 6 starting with scene 2.
Figure 7D:
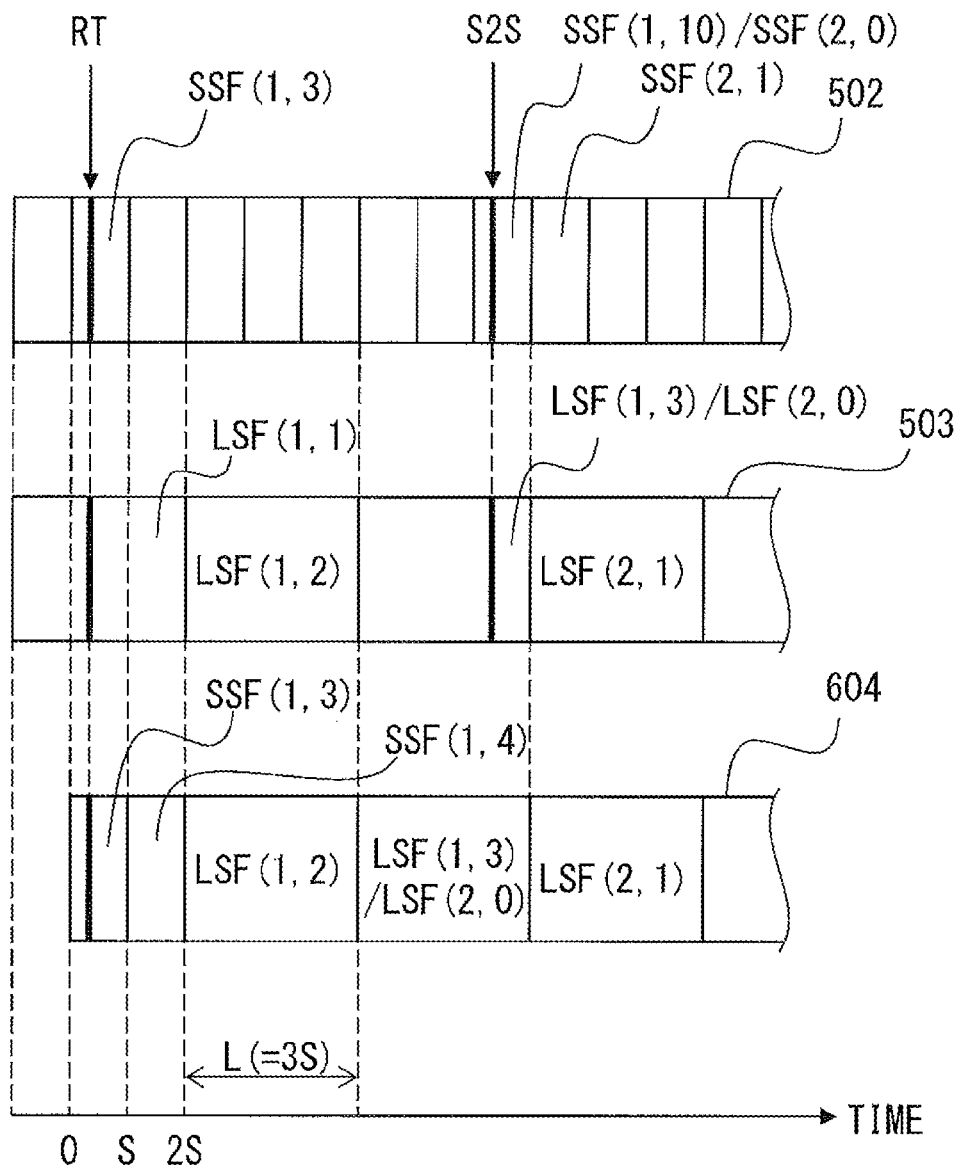
FIG. 7D is a diagram that illustrates a delivery method when delivering the video data file of FIG. 6 starting with any point.
Figure 7E:
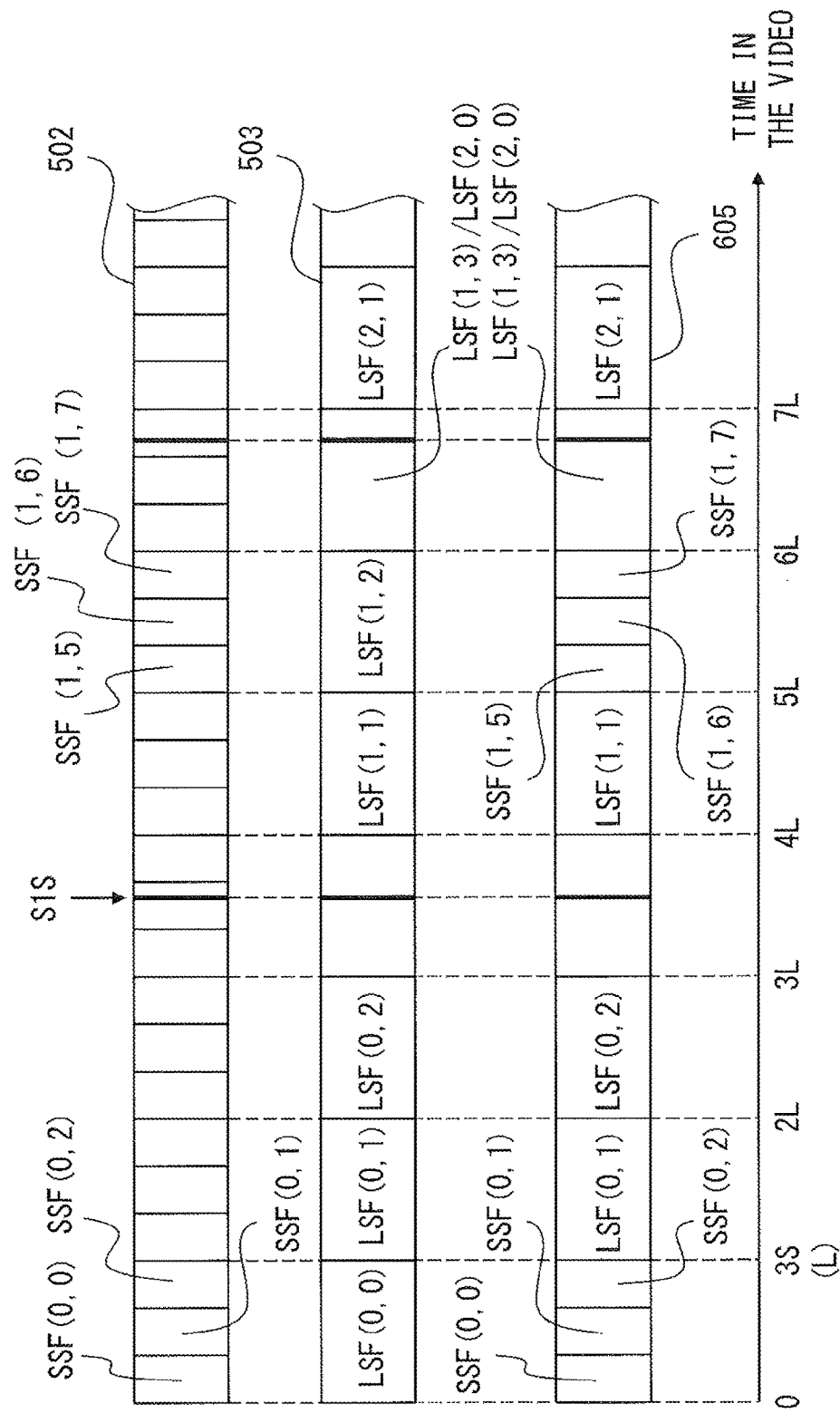
FIG. 7E is a diagram that illustrates another example of a delivery method for delivering the video data file of FIG. 6.

FIG. 7A is a diagram that illustrates a delivery method when delivering the video data file of FIG. 6 starting with scene 1. FIG. 7B is a diagram that illustrates a delivery method when delivering the video data file of FIG. 6 starting with scene 2. FIG. 7C is a diagram that illustrates another delivery method when delivering the video data file of FIG. 6 starting with scene 2. FIG. 7D is a diagram that illustrates a delivery method when delivering the video data file of FIG. 6 starting with any point. FIG. 7E is a diagram that illustrates another example of a delivery method for delivering the video data file of FIG. 6.

One split file LSF (n, q) in the second video data file 503 of FIG. 6 corresponds to three split files SSF (n,m) in the first video data file 502 of FIG. 6. Thus, when performing a delivery to the client 3, the three split files SSF (n,m) in the first video data file and the one split file LSF (n,q) in the second video data file can be selectively delivered. Therefore, when delivering a video data file starting with the beginning (scene 0), first, the delivery server 2 sequentially delivers the three split files SSF (0,0) to SSF (0,2) in the first video data file 502 to the client 3. In this case, the split file SSF (0,0) that is first transferred has a first length of time S (for example, three seconds). This permits the client 3 to shorten the waiting time until the playback starts. Further, the finish time of the third split file SSF (0,2) is consistent with the finish time of the first split file LSF (0,0) in the second video data file 503. Thus, after the transfer of the third split file SSF (0,2) is finished, the delivery server 2 sequentially transfers, to the client 3, the split files in the second video data file 503 starting with the second split file LSF (0,1). The length of time of the split file LSF in the second video data file is three times as long as the length of time of the split file SSF in the first video data file. This permits suppressing of an increase in the load of the delivery server 2 caused by an increase in the number of communications between the client 3 and the delivery server 2.

Further, the location of the frame at the beginning of scene 1 S1S in the first video data file 502 illustrated in FIG. 6 is not consistent with a partition point between split files SSF. Thus, when performing a delivery starting with scene 1, the delivery server 2 starts a transfer starting with a split file SSF (0,10)/SSF (1,0) that includes the frame at the beginning of scene 1 S1S in the first video data file 502, as illustrated in FIG. 7A. In this case, the split file whose finish time is consistent with that of a split file LSF (0,3)/LSF (1,0) that includes the frame at the beginning of scene 1 S1S in the second video data file 503 is a split file SSF (1,1), the next one. Thus, when the transfer of the split file SSF (0,10)/SSF (1,0) is completed, next, the delivery server 2 transfers the split file SSF (1,1). Then, after the transfer of the split file SSF (1,1) is completed, the delivery server 2 sequentially transfers the split files in the second video data file 503 starting with a split file LSF (1,1), as illustrated in FIG. 7A. This permits shortening of the time to transfer the first two split files in a video data file 601 received by the client 3. Therefore, the client 3 can shorten the waiting time until the playback starts. Further, a playback time of a third or greater split file of the video data file 601 received by the client 3 is long. This permits suppressing of an increase in the load of the delivery server 2 caused by an increase in the number of communications between the client 3 and the delivery server 2.

Further, the location of a frame at the beginning of scene 2 S2S in the first video data file 502 illustrated in FIG. 6 is not consistent with a partition point between split files SSF. Thus, when performing a delivery starting with scene 2, the delivery server 2 starts a transfer starting with a split file SSF (1,10)/SSF (2,0) that includes the frame at the beginning of scene 2 S2S in the first video data file, as illustrated in FIG. 7B. In this case, the split file whose finish time is consistent with that of a split file LSF (1,3)/LSF (2,0) that includes the frame at the beginning of scene 2 S2S in the second video data file 503 is a split file SSF (1,10)/SSF (2,0), the next one. Thus, after the transfer of the split file SSF (1,10)/SSF (2,0) is completed, the delivery server 2 sequentially transfers the split files in the second video data file 503 starting with a split file LSF (2,1), as illustrated in FIG. 7B. This permits shortening of the waiting time until the playback starts in the client 3 and also permits suppressing of an increase in the load of the delivery server 2 caused by an increase in the number of communications between the client 3 and the delivery server 2.

As illustrated in FIG. 7B, when the number of split files SSF having a first length of time S in a video data file 602 received by the client 3 is one, there is a possibility that the reception of the next split file LSF having a second length of time L is not completed during the playback of the file. In order to avoid such a situation, the delivery server 2 may transfer two or more split files SSF having a first length of time S when the playback starts, as in a video data file 603 illustrated in FIG. 7C. In the example illustrated in FIG. 7C, after the transfer of the split file SSF (1,10)/SF (2,0) is completed, the delivery server 2 transfers, instead of the split file LSF (2,1) in the second video data file, corresponding three split files SSF (2,1) to SSF (2,3). Accordingly, the client 3 can gradually increase a buffer margin (that is a time from when the transfer of a split file is completed until the playback is finished), which permits completing of reception of the next split file before the playback of the split file that is being played back is finished.

As described above, when changing the number of files M having a first length of time S that are to be transferred according to the location of a frame at the beginning of a scene, the number of split files M is set, for example, within a range that satisfies Formula (1) below.

$$(L/S)/2 < M < (L/S) \times 2 \quad (1)$$

S and L in Formula (1) represent a first length of time and a second length of time, respectively.

Further, when providing a first video data file 502 and a second video data file 503, the length of time of the split file when the playback starts can be a first length of time S even when the playback starts not only from the beginning of a scene but also from any point. For example, while scene 0 is being played back, a user skips a location that is being played back, by operating a progress bar on the player screen (see FIG. 3B). In this case, there is a possibility that a newly designated playback starting point RT is not consistent with, for example, a frame at the beginning of scene 2 S2S, as in a video data file 604 illustrated in FIG. 7D. Even so, the delivery server 2 according to the present embodiment can start performing a delivery (transfer) starting with a split file SSF (1,3) in the first video data file 502. This permits shortening of the waiting time until the playback starts in the client 3 and also permits suppressing of an increase in the load of the delivery server 2 caused by an increase in the number of communications between the client 3 and the delivery server 2.

Furthermore, when providing the first video data file 502 and the second video data file 503, the delivery server 2 can appropriately switch between a delivery of a split file having a first length of time S and a delivery of a split file having a second length of time L while a video data file is being delivered (transferred). As an example, take a case in which the delivery server 2 starts performing a delivery from the beginning of video data (scene 0), and transfers a split file LSF having a second length of time L after completing the transfer of split files SSF (0,0) to SSF (0,2) having a first length of time S, as in a video data file 605 illustrated in FIG. 7E. It is assumed that there is a decrease in transfer rate, for some reason, between time 4L and time 5L, that is, while a split file LSF (1,1) having a second length of time L is being transferred. In this case, if the delivery server 2 transfers a split file LSF (1,2) having a second length of time L as the next split file in a state in which the transfer rate remains unimproved, in the client 3, a transfer awaiting state due to delay may be created, which results in unintended stopping of the video. However, as illustrated in FIG. 7E, if the delivery server 2 holds split files SSF (1,5) to SSF (1,7) having a first length of time S that correspond to the split file LSF (1,2), it can transfer the split files SSF (1,5) to SSF (1,7). This permits suppressing of the occurrence of a waiting time for transfer caused by a decrease in transfer rate as much as possible, and thus permits the client 3 to playback the video stably.

As described above, when delivering a video data file split into a plurality of split files to the client 3, the delivery server 2 delivers (transfers) a split file having a short length of time (playback time) when the delivery starts. This permits shortening of the waiting time until the playback starts in the client 3 in the video delivery system 1 according to the present embodiment. Further, after transferring, to the client 3, a split file having a short length of time the predetermined number of times, the delivery server 2 switches the split file to be transferred to a split file having a long length of time. This permits suppressing of an increase in the number of communications between the client 3 and the delivery server 2 in the video delivery system 1 according to the present embodiment. As a result, in the video delivery system 1 according to the present embodiment, it is possible, at the same time, to shorten the waiting time until the playback starts and to suppress an increase in the load of a delivery server caused by an increase in the number of communications with a client.

Further, in the video delivery system 1 according to the present embodiment, a video portion near a playback point in one video data file, such as the beginning of a scene, which can be designated as a playback starting point, is split into split files having a short length of time. This makes it easy to control, in the delivery server 2, the number of files having a short length of time that are to be transferred when the playback starts.

Furthermore, the provision of a first video data file split into split files having a short length of time and a second video data file split into split files having a long length of time permits the delivery server 2 to transfer a split file having a short length of time when the playback starts, regardless of the playback starting point.

A combination of a first length of time S and a second length of time L and the number of split files having the first length of time S that are to be transferred when the playback starts can be appropriately changed according to the transfer rate or playback rate of a split file.

FIG. 8 is a sequence diagram that illustrates another example of a procedure of delivering a split file. For example, when the transfer rate of a split file whose playback time is five seconds is 1.25 times (5/4 times) the playback rate, it takes four seconds to complete the transfer of the split file, as illustrated in FIG. 8. Thus, if, while one split file is being played back, the next file is transferred, a margin that can be ensured in the client 3 is one second. Therefore, assuming that a first length of time S is five seconds and a second length of time L is ten seconds, when five split files having a first length of time S are played back, an absolute value of a difference between the time that was needed to receive the files and the time to complete the playback exceeds the transfer time of the split file having a second length of time L. Accordingly, in this case, by transferring five split files having a first length of time when the delivery starts and by transferring a split file having a second length of time as a sixth or greater split file to be transferred, the client 3 can shorten the waiting time until the playback starts and can prevent unintended stopping of the video caused by a waiting time for transfer.

The delivery server 2 that delivers a video data file and the client 3 that plays back the video data file mentioned above each is realized by a computer and a predetermined program. Hardware configurations of computers used as the delivery server 2 and the client 3 will be described with reference to FIG. 9. FIG. 9 illustrates examples of hardware configurations of a delivery server and a client.

In FIG. 9, a computer 200 is a computer that is used as the delivery server 2. The computer 200 includes a central processing unit (CPU) 201, a main storage device 202, an auxiliary storage device 203, an input device 204, a display device 205, a communication interface 206, and a recording medium driving device 207. The pieces of hardware mentioned above in the computer 200 are connected to one another via a bus 210, and data can be transmitted between any two points.

The CPU 201 is an arithmetic processing unit that controls the entire operation of the computer 200 by executing various programs.

The main storage device 202 is semiconductor memory such as a read only memory (ROM) and a random access memory (RAM). The ROM has recorded therein, for example, a predetermined basic control program that is read by the CPU 201 when the computer 200 boots. The RAM is used as a working storage area as needed when the CPU 201 executes various programs.

The auxiliary storage device 203 is storage that is large in capacity compared with the main storage device 202, such as a hard disk drive (HDD). The auxiliary storage device 203 stores therein a video data file for delivery and various pieces of data such as various programs executed by the CPU 201. The CPU 201 reads and executes the programs stored in the auxiliary storage device 203, and reads the various pieces of data stored in the auxiliary storage device 203 as needed. Further, in response to a request from the client 3, the CPU 201 transfers the video data file for delivery stored in the auxiliary storage device 203 to the client 3.

The input device 204 is, for example, a keyboard device or a mouse device, and when an operator (user) of the computer 200 operates it, it transmits input information associated with the operational context to the CPU 201.

The display device 205 is, for example, a liquid crystal display, and displays various texts and images in accordance with display data transmitted from the CPU 201.

The communication interface 206 communicatively connects the computer 200 to a communication network (not shown) such as the Internet, so as to implement communication of the computer 200 with, for example, the client 3 via the communication network. Further, the communication interface 206 also communicates with, for example, another computer that creates the above-mentioned video data file.

The recording medium driving device 207 reads a program or data that is recorded on a portable recording medium (not shown), and records, for example, the data held in the auxiliary storage device 203 on the portable recording medium. For example, a flash memory that is equipped with a universal serial bus (USB) standard connector can be used as the portable recording medium. Further, an optical disk such as a compact disc read only memory (CD-ROM) or a digital versatile disc read only memory (DVD-ROM) can also be used as the portable recording medium.

In the computer 200, for example, the CPU 201, the main storage device 202, and the auxiliary storage device 203 work in cooperation in accordance with a program for video delivery, which permits delivering of the video data file mentioned above.

On the other hand, in FIG. 9, a computer 300 is a computer that is used as the client 3. The computer 300 includes a CPU 301, a main storage device 302, an auxiliary storage device 303, a video processing device 304, an input device 305, a display device 306, a communication interface 307, and a recording medium driving device 308. The pieces of hardware mentioned above in the computer 300 are connected to one another via a bus 310, and data can be transmitted between any two points.

The CPU 301 is an arithmetic processing unit that controls the entire operation of the computer 300 by executing various programs.

The main storage device 302 is semiconductor memory such as a ROM and a RAM. The ROM has recorded therein, for example, a predetermined basic control program that is read by the CPU 301 when the computer 300 boots. The RAM is used as a working storage area as needed when the CPU 301 executes various programs.

The auxiliary storage device 303 is storage that is large in capacity compared with the main storage device 302, such as a hard disk drive (HDD) or a solid state drive (SSD). The auxiliary storage device 303 stores therein various programs and various pieces of data executed by the CPU 301. The CPU 301 reads and executes the programs stored in the auxiliary storage device 303, and reads the various pieces of data stored in the auxiliary storage device 303 as needed.

The video processing device 304 is a device that, for example, performs playback of video data in the moving picture experts group (MPEG) format.

The input device 305 is, for example, a keyboard device or a mouse device, and when a user of the computer 300 operates it, it transmits input information associated with the operational context to the CPU 301.

The display device 306 is, for example, a liquid crystal display, and displays various texts and videos in accordance with display data transmitted from the CPU 301 or the video processing device 304.

The communication interface 307 communicatively connects the computer 300 to a communication network such as the Internet, so as to implement communication of the computer 300 with, for example, the delivery server 2 via the communication network.

The recording medium driving device 308 reads a program or data that is recorded on a portable recording medium (not shown), and records, for example, the data held in the auxiliary storage device 303 on the portable recording medium. For example, a flash memory that is equipped with a USB standard connector can be used as the portable recording medium. Further, an optical disk such as a CD-ROM or a DVD-ROM can also be used as the portable recording medium.

In the computer 300, for example, the CPU 301, the main storage device 302, the auxiliary storage device 303, and the video processing device 304 work in cooperation in accordance with a program for video delivery, which permits acquiring of the video data file mentioned above and performing of a playback process on it.

<Second Embodiment>

Figure 10:
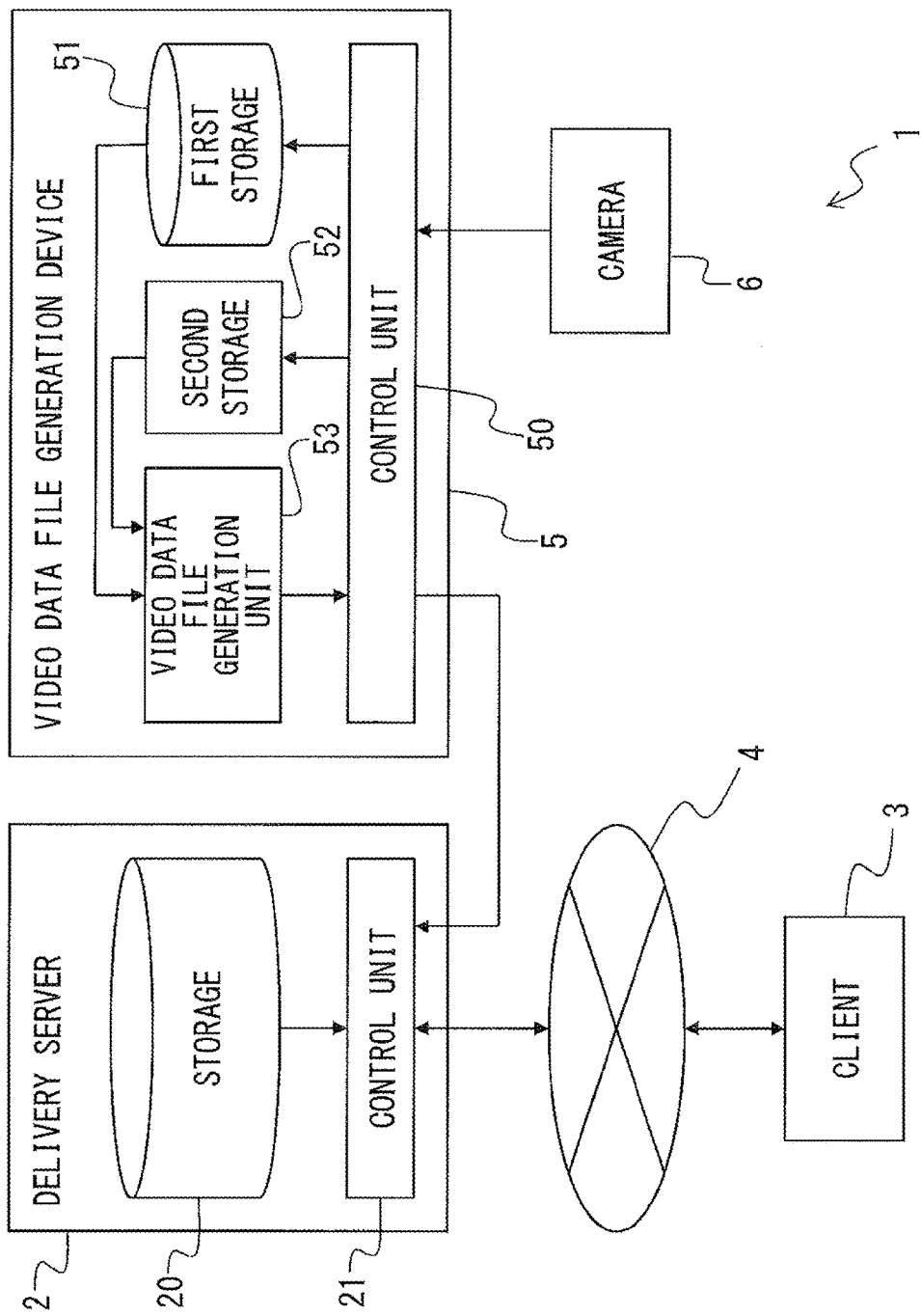
FIG. 10 is a block diagram that illustrates an example of a video delivery system according to a second embodiment.

FIG. 10 is a block diagram that illustrates an example of a video delivery system according to a second embodiment. In FIG. 10, a video delivery system 1 includes a delivery server 2, a client 3, and a video data file generation device 5. The delivery server 2 and the client 3 are communicatively connected via a communication network 4 such as the Internet. As described in the first embodiment, it is sufficient if the configurations of the delivery server 2 and the client 3 are any of the configurations of a delivery server and a client for existing streaming delivery.

The video data file generation device 5 generates a video data file as described in the first embodiment, using a video (moving image) captured by a camera 6 and scene information of the video. This video data file generation device 5 includes a control unit 50, a first storage 51 that stores therein video data, a second storage 52 that stores therein the scene information, and a video data file generation unit 53.

The control unit 50 performs processes such as acquiring the video captured by the camera 6 and the scene information and registering the generated video data file in the delivery server 2. The video data file generation unit 53 generates a video data file for delivery using a method described below.

Figure 11A:
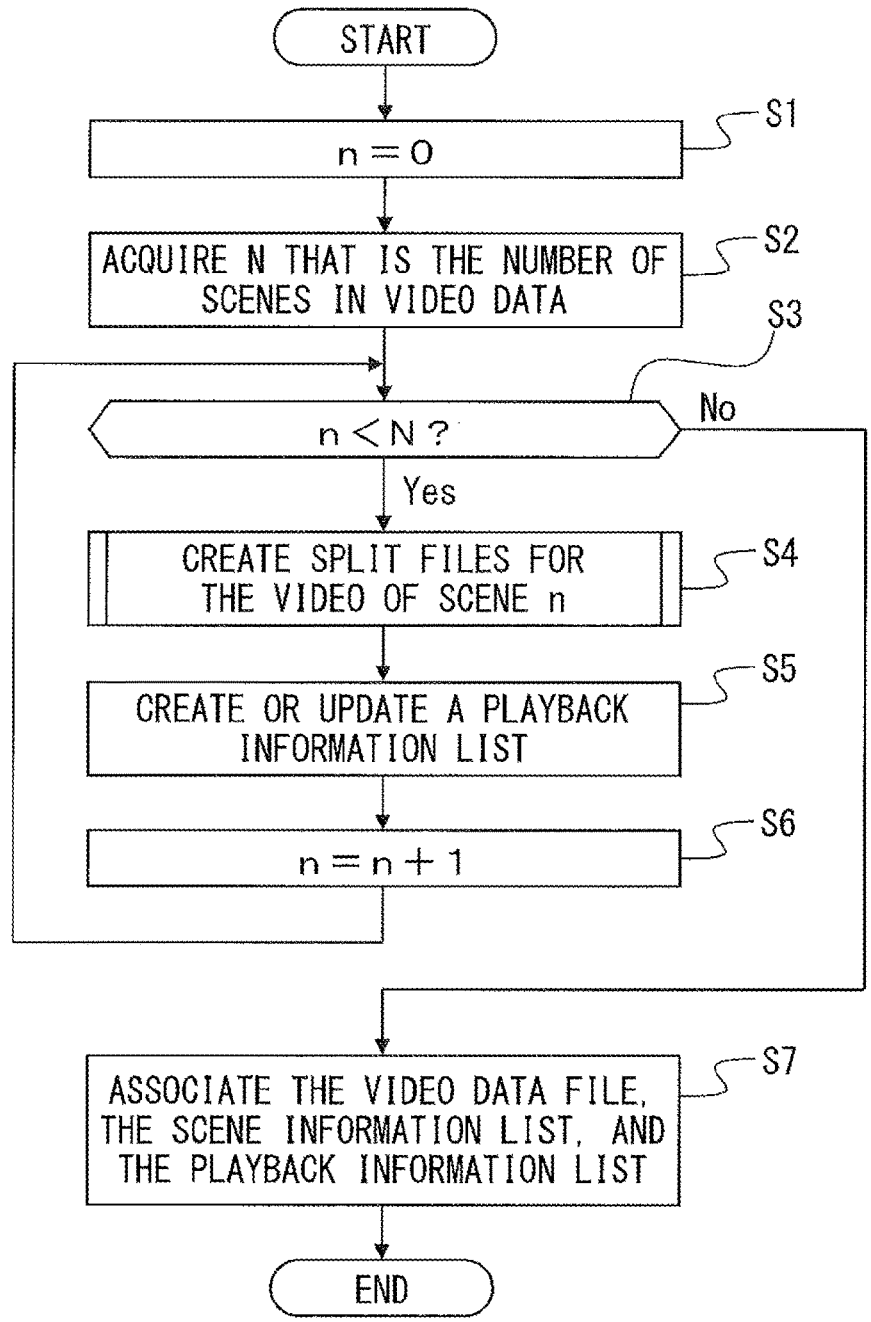
FIG. 11A is a flowchart that illustrates a first example of a method for creating a video data file.
Figure 11B:
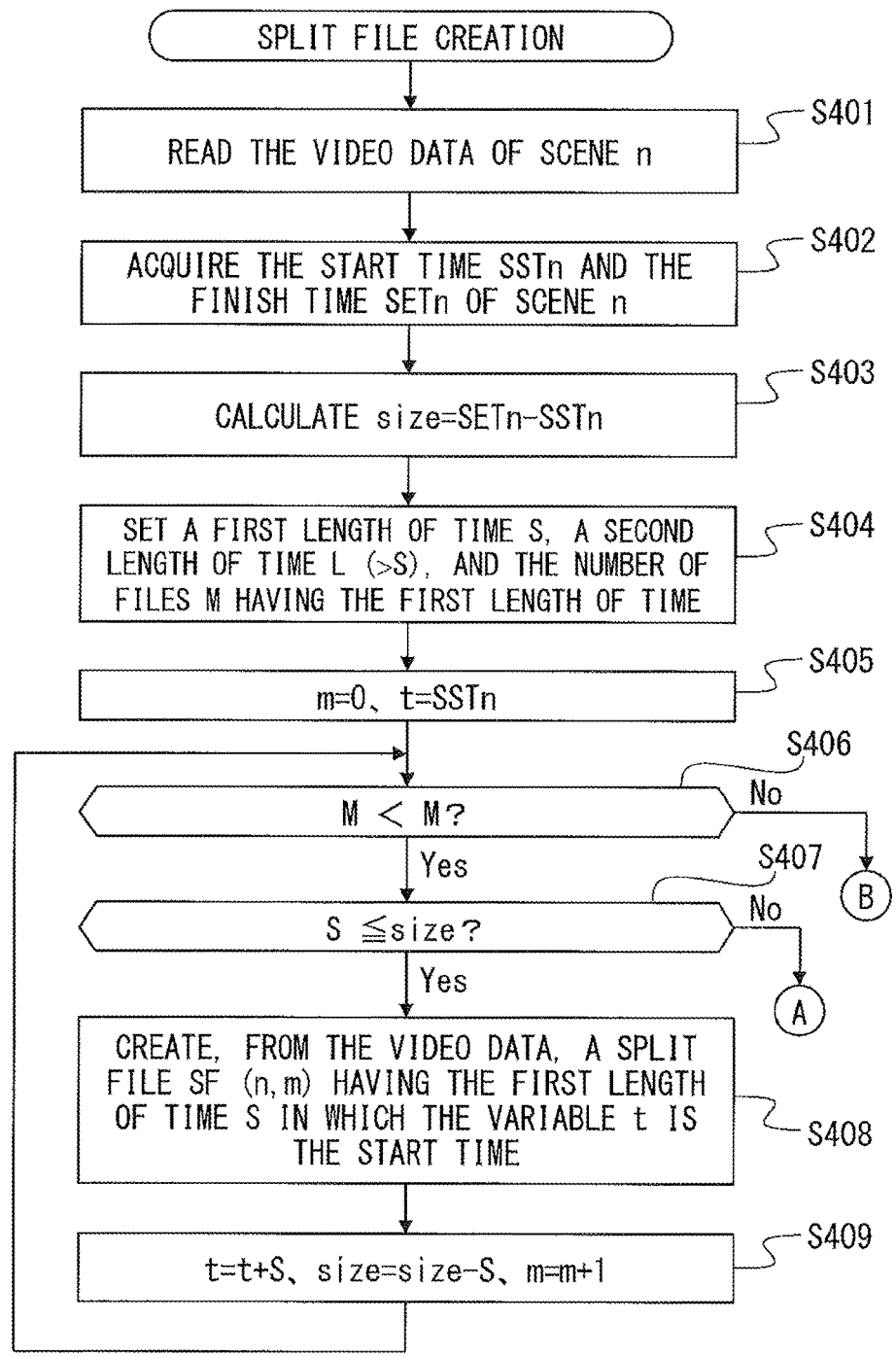
FIG. 11B is Part 1 of a flowchart that illustrates an example of a process of creating a split file.
Figure 11C:
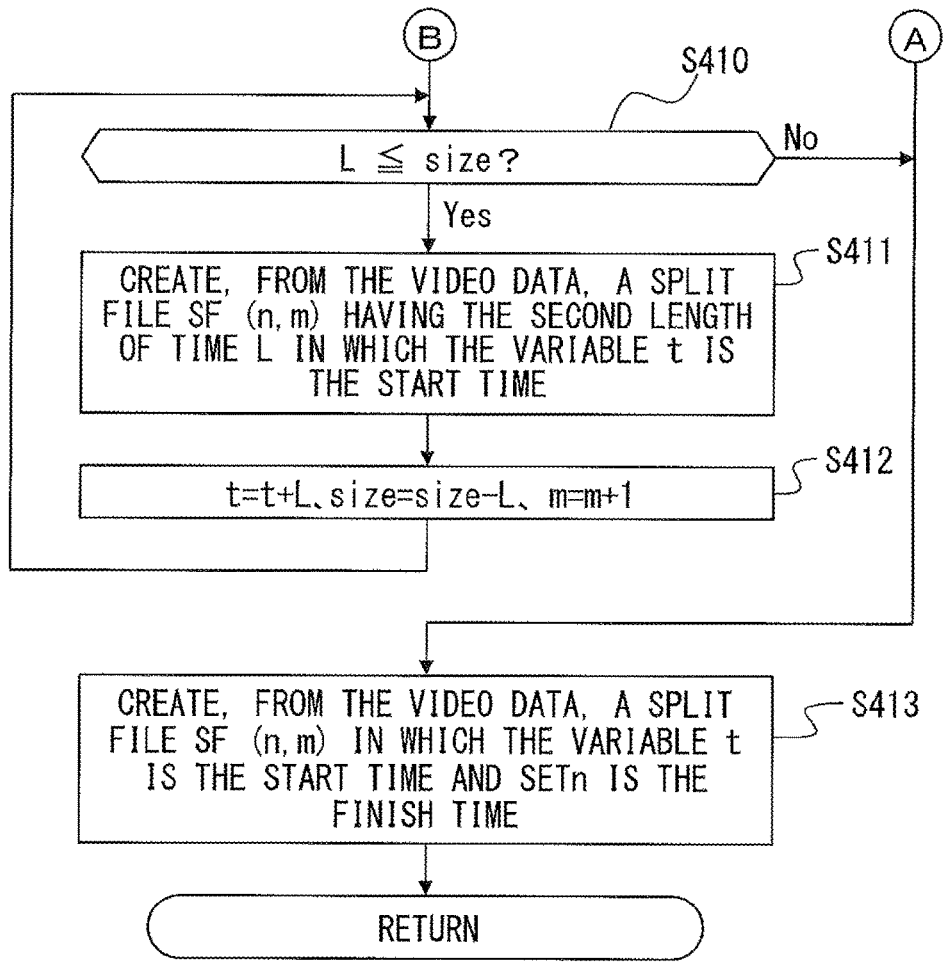
FIG. 11C is Part 2 of a flowchart that illustrates an example of a process of creating a split file.

FIG. 11A is a flowchart that illustrates a first example of a method for creating a video data file. FIG. 11B is Part 1 of a flowchart that illustrates an example of a process of creating a split file. FIG. 11C is Part 2 of a flowchart that illustrates an example of a process of creating a split file.

The first example of a method for creating a video data file is a method for creating a video data file that is partitioned into split files having a predetermined length of time from the beginning of a scene for each scene, as is the case in the video data file illustrated in FIG. 2A. As illustrated in FIG. 11A, in this creation method, first, the video data file generation unit 53 initializes a variable n that discriminates scenes (Step S1). In the present embodiment, as illustrated in, for example, FIG. 2A, the first scene in the video data file is scene 0. Thus, in Step S1, the variable n is 0 in the video data file generation unit 53.

Next, the video data file generation unit 53 acquires N that is the number of scenes from scene information of video data to be split (Step S2).

Then, the video data file generation unit 53 compares the variable n with the number of scenes N (Step S3). In the present embodiment, the video data is split into N scenes from scenes 0 to N−1 because the first scene is scene 0. Thus, when n<N (Step S3; Yes), the video data file generation unit 53 performs a process of creating split files for the video portion of scene n (Step S4).

When the process of Step S4 ends, next, the video data file generation unit 53 creates or updates a playback information list (Step S5). Then, the video data file generation unit 53 increments the variable n by one (Step S6), and returns to Step S3. After that, the video data file generation unit 53 repeats the processes of Steps S4 to S6 until the performance of the process of Step S4 on all the scenes ends.

When the performance of the process of Step S4 on all the scenes ends and n=N (Step S3; No), the video data file generation unit 53 associates the created video data file, the playback information list, and the scene information list (Step S7). Then, the process of creating a video data file with respect to one video data ends.

Next, the process of creating a split file in Step S4 will be described with reference to FIGS. 11B and 11C.

In Step S4 for creating a split file for the video portion of scene n, as illustrated in FIG. 11B, first, the video data file generation unit 53 reads the video data of scene n (Step S401).

Next, the video data file generation unit 53 acquires the start time SSTn and the finish time SETn of scene n (Step S402), and calculates "size" that is a playback time for a portion of scene n that has not been split into split files yet (Step S403). When the processes of and after Step S404 have not been performed, "size" that is the playback time is the difference between the start time SSTn and the finish time SETn because the portion has not been split into split files.

Next, the video data file generation unit 53 sets a first length of time S, a second length of time L, and the number of split files M having the first length of time (Step S404).

Then, the video data file generation unit 53 initializes a variable m that discriminates files in scene n (m=0), and sets a variable t that represents time in the video data as the start time SSTn (Step S405).

Next, the video data file generation unit 53 compares the variable m with the number of split files M having the first length of time S (Step S406). When m<M (Step S406; Yes), the video data file generation unit 53 performs a process of generating a split file having the first length of time S. In order to generate a split file having the first length of time S, "size" that is the playback time for the portion that has not been split into split files, has to be longer than the first length of time S. Thus, when m<M, next, the video data file generation unit 53 compares the first length of time S with "size" that is the playback time for the portion that has not been split into split files (Step S407). When S>size, it is not possible to create a split file having the first length of time S from the portion of the video data that has not been split into split files. Thus, as illustrated in FIG. 11C, when S>size (Step S407; No), the video data file generation unit 53 creates a split file SF (n,m) in which the variable t is the start time and SETn is the finish time (Step S413) and ends the process of creating a split file (RETURN).

On the other hand, when S≤size (Step S407; Yes), next, the video data file generation unit 53 generates, from the video data, a split file SF (n,m) having the first length of time S in which the variable t is the start time (Step S408). Then, the video data file generation unit 53 updates the variable t, "size" that is the playback time for the portion that has not been split into split files, and the variable m (Step S409), and returns to Step S406. Step S409 is performed when a split file having the first length of time S is created. Thus, in Step S409, the video data file generation unit 53 sets, to t+S, the variable t that is the start time of the split file, and, to size−S, "size" that is the playback time for the portion that has not been split. Further, the video data file generation unit 53 increments the variable m that discriminates files by one.

After repeating the processes of Step S406 to Step S409 to create M split files SF (n,m) having the first length of time S (Step S406; No), next, as illustrated in FIG. 11C, the video data file generation unit 53 compares the second length of time L with "size" that is the playback time for the portion that has not been split into split files (Step S410). When L>size, it is not possible to create a split file having the second length of time L from the portion of the video data that has not been split into split files. Thus, when L>size (Step S410; No), the video data file generation unit 53 creates a split file SF (n,m) in which the variable t is the start time and SETn is the finish time (Step S413) and ends the process of creating a split file.

On the other hand, when L≤size (Step S410; Yes), next, the video data file generation unit 53 creates, from the video data, a split file SF (n,m) having the second length of time L in which the variable t is the start time (Step S411). Then, the video data file generation unit 53 updates the variable t, "size" that is the playback time for the portion that has not been split into split files, and the variable m (Step S412), and returns to Step S410. Step S411 is performed when a split file having the second length of time L is created. Thus, in Step S412, the video data file generation unit 53 sets, to t+L, the variable t that is the start time of the split file, and, to size−L, "size" that is the playback time for the portion that has not been split. Further, the video data file generation unit 53 increments the variable m that discriminates files by one.

The order of Step S401 to Step 405 is not restricted to the order illustrated in FIG. 11B, but can be appropriately changed to the extent that no conflict arises in the whole process.

Figure 12A:
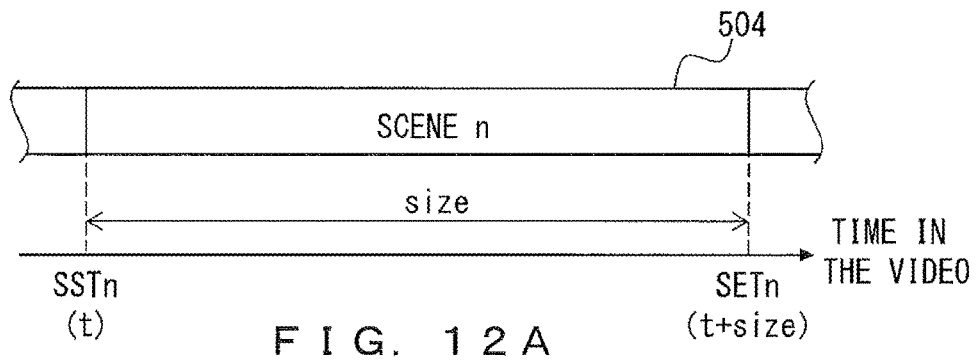
FIG. 12A is a diagram (Part 1) that illustrates a process of creating a split file when M=3.
Figure 12B:
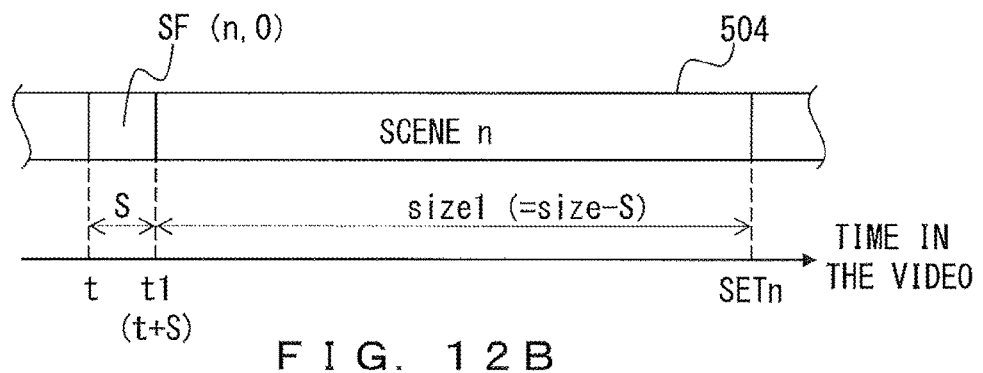
FIG. 12B is a diagram (Part 2) that illustrates a process of creating a split file when M=3.
Figure 12C:
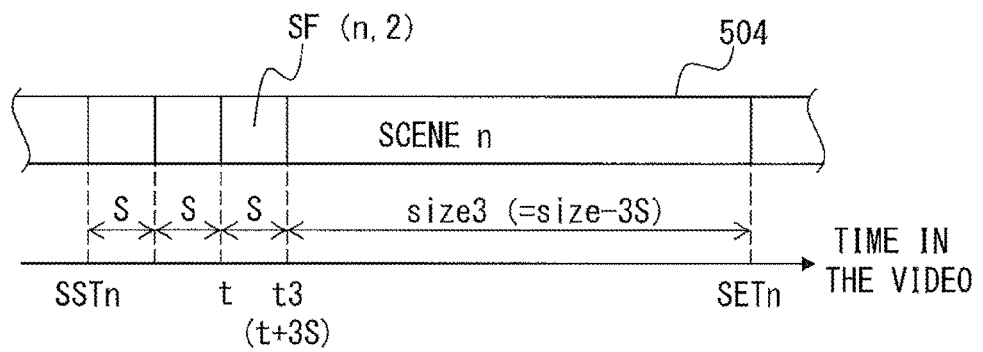
FIG. 12C is a diagram (Part 3) that illustrates a process of creating a split file when M=3.

A specific example of the process illustrated in FIGS. 11B and 11C will be described with reference to FIGS. 12A to 12E. FIG. 12A is a diagram (Part 1) that illustrates a process of creating a split file when M=3. FIG. 12B is a diagram (Part 2) that illustrates a process of creating a split file when M=3. FIG. 12C is a diagram (Part 3) that illustrates a process of creating a split file when M=3. FIG. 12D is a diagram (Part 4) that illustrates a process of creating a split file when M=3. FIG. 12E is a diagram (Part 5) that illustrates a process of creating a split file when M=3.

When splitting the video portion of scene n into split files, first, as is the case in a video data file 504 illustrated in FIG.

12A, the video data file generation unit 53 acquires the start time SSTn and the finish time SETn of scene n, and calculates "size" that is the playback time for the portion that has not been split into split files (Steps S401 to S403).

Here, if "size" (=SETn−SSTn) that is the playback time is sufficiently longer than the second length of time L (for example, size≈4L), the video data file generation unit 53 creates, at the beginning of scene n, a split file SF (n,0) having the first length of time S, as illustrated in FIG. 12B (Step S408).

After that, the video data file generation unit 53 repeats the processes of Steps S406 to S409. When M=3, that is, when the number of files having the first length of time S has been set to three, the video data file generation unit 53 performs the processes of Steps S406 to S409 three times. As a result, three split files having the first length of time S are created in the beginning portion of scene n of the video data file 504, as illustrated in FIG. 12C. In this case, as a result of performing the third process of Step S409, the start time of a split file that will be created next becomes t3 (=t+3S), and the playback time for the portion that has not been split becomes size3 (=size−3S).

After creating three split files having the first length of time S (Step S406; No), as is the case in a video data file 504 illustrated in FIG. 12D, this time, the video data file generation unit 53 creates a split file SF (n,3) having the second length of time L (Step S411).

Then, the video data file generation unit 53 repeats the processes of Steps S410 to S412, and as illustrated in FIG. 12E, when "size" that is the playback time for the video portion that has not been split has become shorter than the second length of time L, the video data file generation unit 53 creates the last split file SF (n,5) of scene n (Step S413).

Figure 13B:
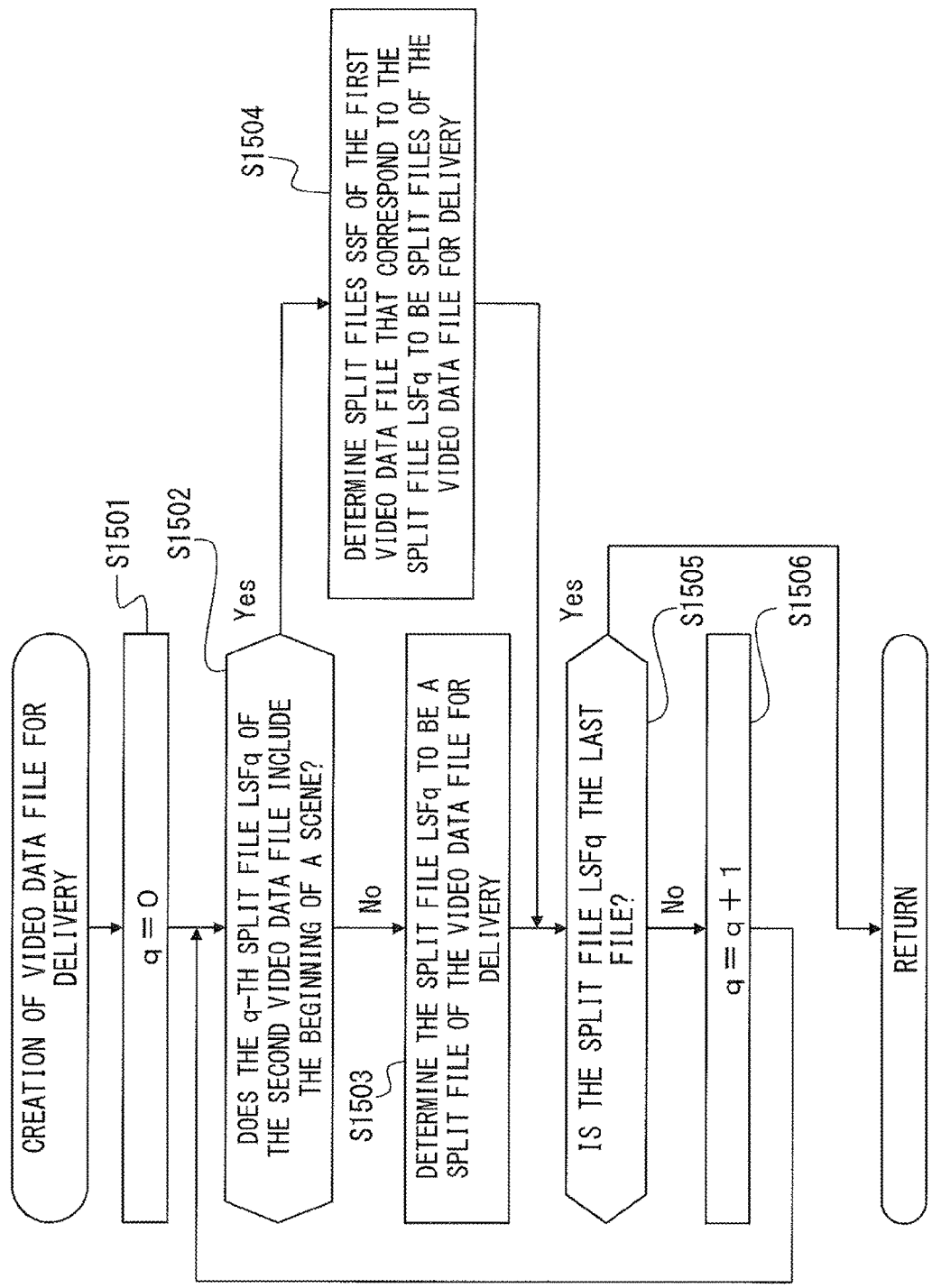
FIG. 13B is a flowchart that illustrates an example of a process of creating a video data file for delivery.

FIG. 13A is a flowchart that illustrates a second example of a method for creating a video data file. FIG. 13B is a flowchart that illustrates an example of a process of creating a video data file for delivery.

The second example of a method for creating a video data file is a method for creating a video data file that is split by the second length of time L at regular intervals from the beginning of video data and in which a section that includes a frame at the beginning of a scene is split by the first length of time S, as is the case in the video data illustrated in FIG. 4. As illustrated in FIG. 13A, in this creation method, first, the video data file generation unit 53 sets a first length of time S and a second length of time L (Step S11). In Step S11, the video data file generation unit 53 performs setting of these so that the second length of time L is an integral multiple of the first length of time S, for example, the first length of time S is three seconds and the second length of time L is nine seconds.

Next, the video data file generation unit 53 acquires video data to be split and scene information (Step S12).

Next, the video data file generation unit 53 creates a first video data file obtained by splitting the video data by the first length of time S (Step S13), and creates a second video data file obtained by splitting the video data by the second length of time L (Step S14). In Step 13, the video data file generation unit 53 serially numbers each split file in the first video data file using integers starting with zero. Likewise, in Step S14, the video data file generation unit 53 serially numbers each split file in the second video data file using integers starting with zero.

Next, the video data file generation unit 53 creates a video data file for delivery using the first and second video data files (Step S15).

Then, when completing the creation process of Step S15, the video data file generation unit 53 associates the created video data file for delivery, the playback information list, and the scene information list (Step S16). Then, the process of creating a video data file for delivery with respect to one video data ends.

Next, the process of creating video data for delivery in Step S15 will be described with reference to FIG. 13B. In Step S15 for creating a video data file for delivery, first, the video data file generation unit 53 initializes a variable q, as illustrated in FIG. 13B (Step S1501).

Next, the video data file generation unit 53 confirms whether the q-th split file LSFq of the second video data file includes the beginning of a scene (Step S1502). When the split file LSFq does not include the beginning of the scene (Step S1502; No), the video data file generation unit 53 determines it to be a split file of the video data file for delivery (Step S1503).

On the other hand, when the split file LSFq includes the beginning of the scene (Step S1502; Yes), a plurality of split files SSF of the first video data file that correspond to the split file LSFq are determined to be split files of the video data file for delivery (Step S1504).

When the video data file generation unit 53 has determined a split file of the video data file for delivery in Step S1503 or S1504, next, it confirms whether the split file LSFq is the last file of the second video data file (Step S1505). When the split file LSFq is the last file (Step S1505; Yes), the process of creating a video data file for delivery ends (RETURN).

On the other hand, when the split file LSFq is not the last file (Step S1505; No), the video data file generation unit 53 increments the variable q by one (Step S1506), and returns to Step S1502.

Figure 14:
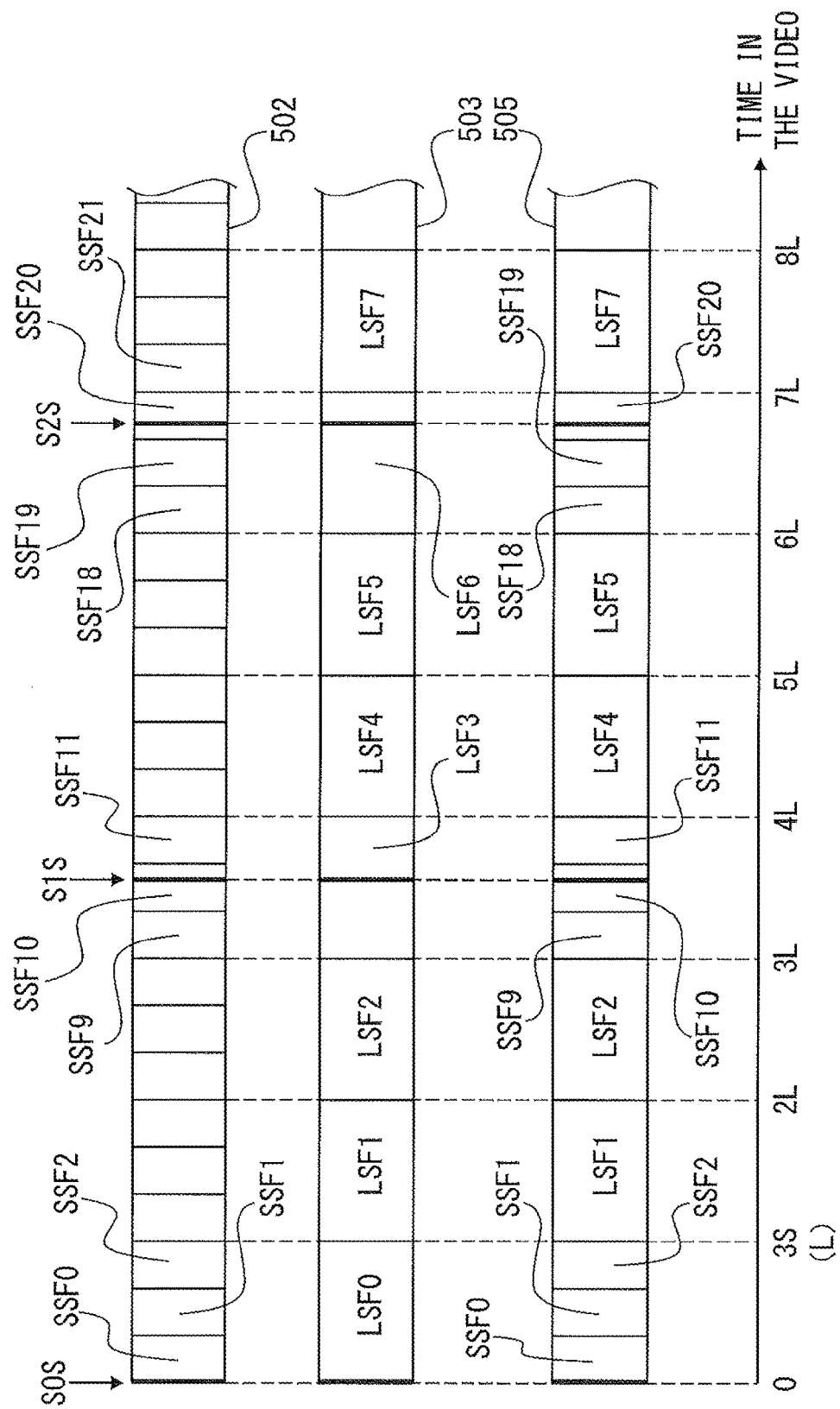
FIG. 14 is a diagram that illustrates a specific example of a process of creating a video data file for delivery.

A specific example of the process illustrated in FIGS. 13A and 13B will be described with reference to FIG. 14. FIG. 14 is a diagram that illustrates a specific example of a process of creating a video data file for delivery.

In the second example of a method for creating a video data file, a first video data file 502 split into split files SSF having a first length of time S and a second video data file 503 split into split files LSF having a second length of time L are created, as illustrated in FIG. 14. In this case, the second length of time L is an integral multiple of the first length of time S, so the start time (finish time) of each of the split files of the second video data file 503 is consistent with the start time (finish time) of any of the split files of the first video data file 502. Thus, even if one split file LSF of the second video data file 503 is replaced with split files SSF of the first video data file whose playback time corresponds to that of the split file LSF, the video will not be deteriorated at the start time (finish time). Therefore, in the second example, from among the split files LSF of the second video data file 503, the video data file generation unit 53 replaces the split files LSF0, LSF3, and LSF6 that include the beginning of a scene with the corresponding split files SSF of the first video data file 502. This permits the video data file generation unit 53 to change the video portion near a playback point, such as the beginning of a scene, which can be designated as a playback starting point, so that it is constituted of split files having a short length of time, as is the case in a video data file 505 illustrated in FIG. 14. The waiting time for playback in the client 3 can be shortened by delivering the video data file 505 by means of the delivery server 2.

In the process illustrated in FIGS. 13A and 13B, only the split files that include the beginning of a scene in the second video data file are replaced with the split files having a short length of time. However, in the second example of a method for creating a video data file, the process is not restricted to this, and a split file that includes the beginning of a scene and the next split file may be replaced with split files having a short length of time.

Figure 15:
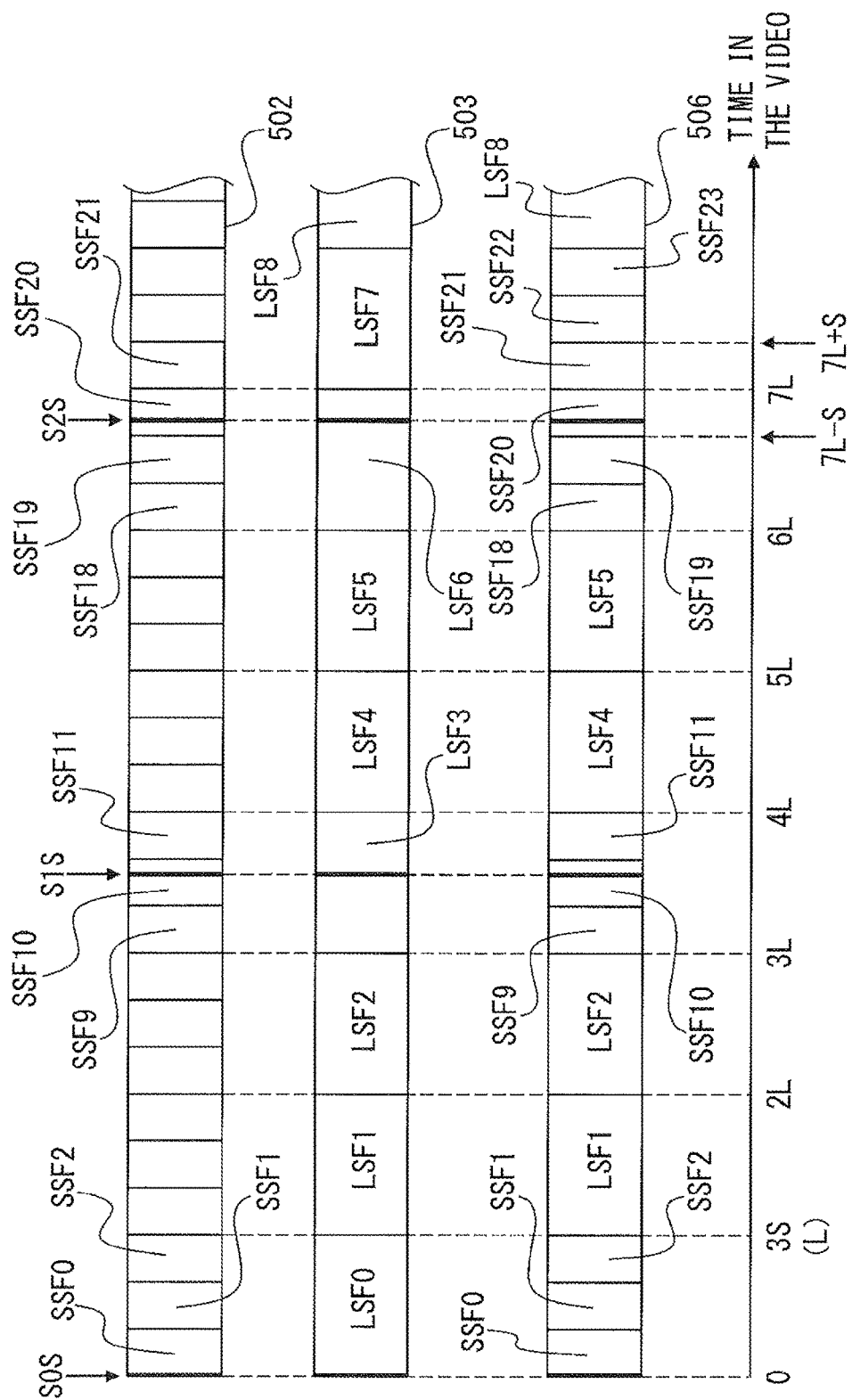
FIG. 15 is a diagram that illustrates an application of the second example of a method for creating a video data file.

FIG. 15 is a diagram that illustrates an application of the second example of a method for creating a video data file. When delivering the video data file 505 of FIG. 14, a split file that will be delivered (transferred) next to split files SSF0 and SSF10 that respectively include a frame at the beginning of video data S0S and a frame at the beginning of scene 1 S1S is also a split file having a first length of time S. However, when delivering the video data file 505 of FIG. 14, a split file that will be transferred next to a split file SSF20 that includes a frame at the beginning of scene 2 S2S is a split file LSF7 having a second length of time L. As a result, depending on the transfer rate, there is a possibility that the transfer of the next split file LSF7 is not completed before the playback of the split file SSF20 is completed and a transfer awaiting state is created.

In order to avoid such a waiting time for transfer, when a split file having a long length of time follows a split file that includes a frame at the beginning of a scene, the split file having a long length of time maybe split into split files SSF21 to SSF23 having a short length of time, as is the case in a video data file 506 illustrated in FIG. 15.

Figure 16A:
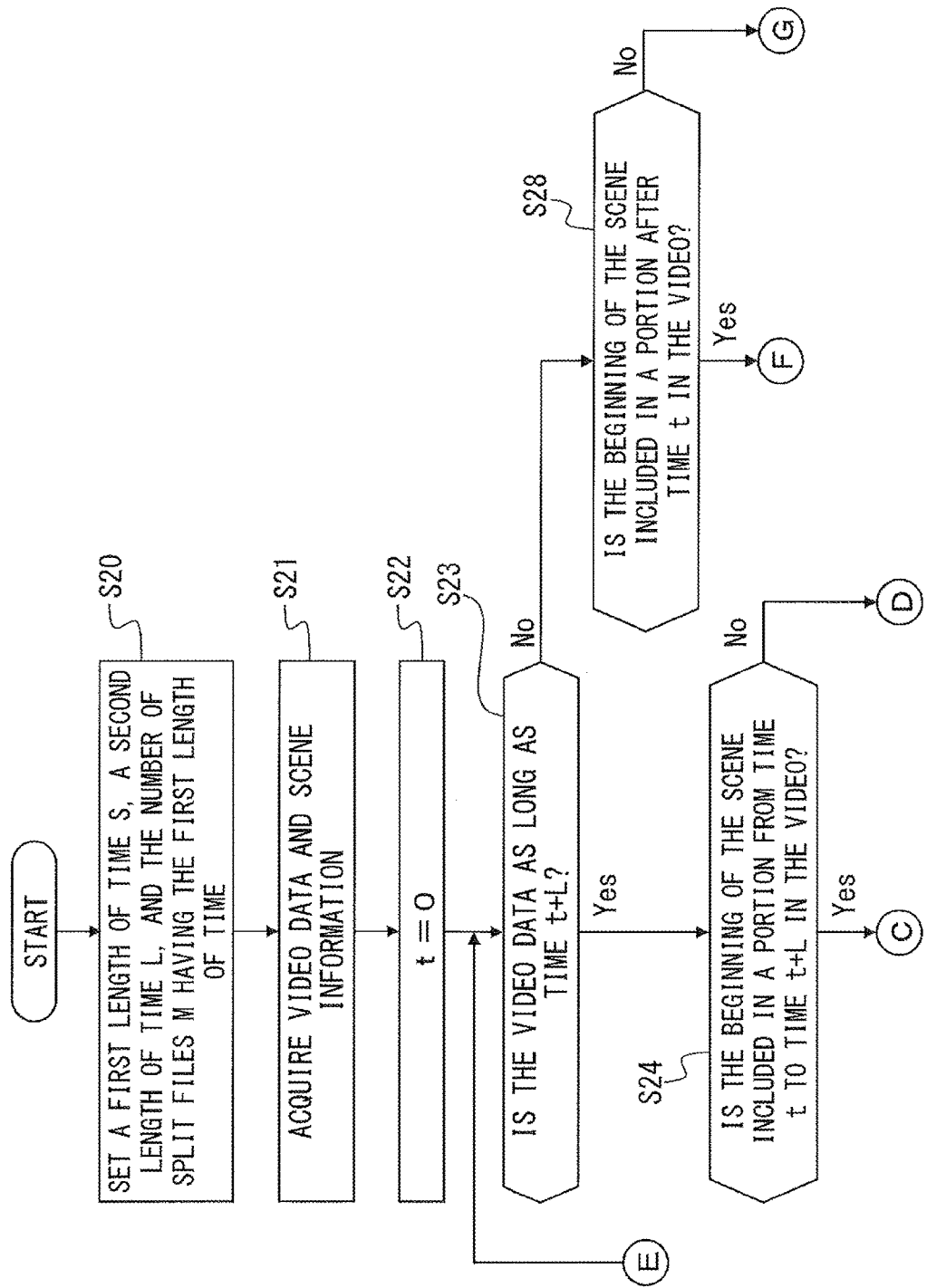
FIG. 16A is Part 1 of a flowchart that illustrates a third example of a method for creating a video data file.

FIG. 16A is Part 1 of a flowchart that illustrates a third example of a method for creating a video data file.

Figure 16B:
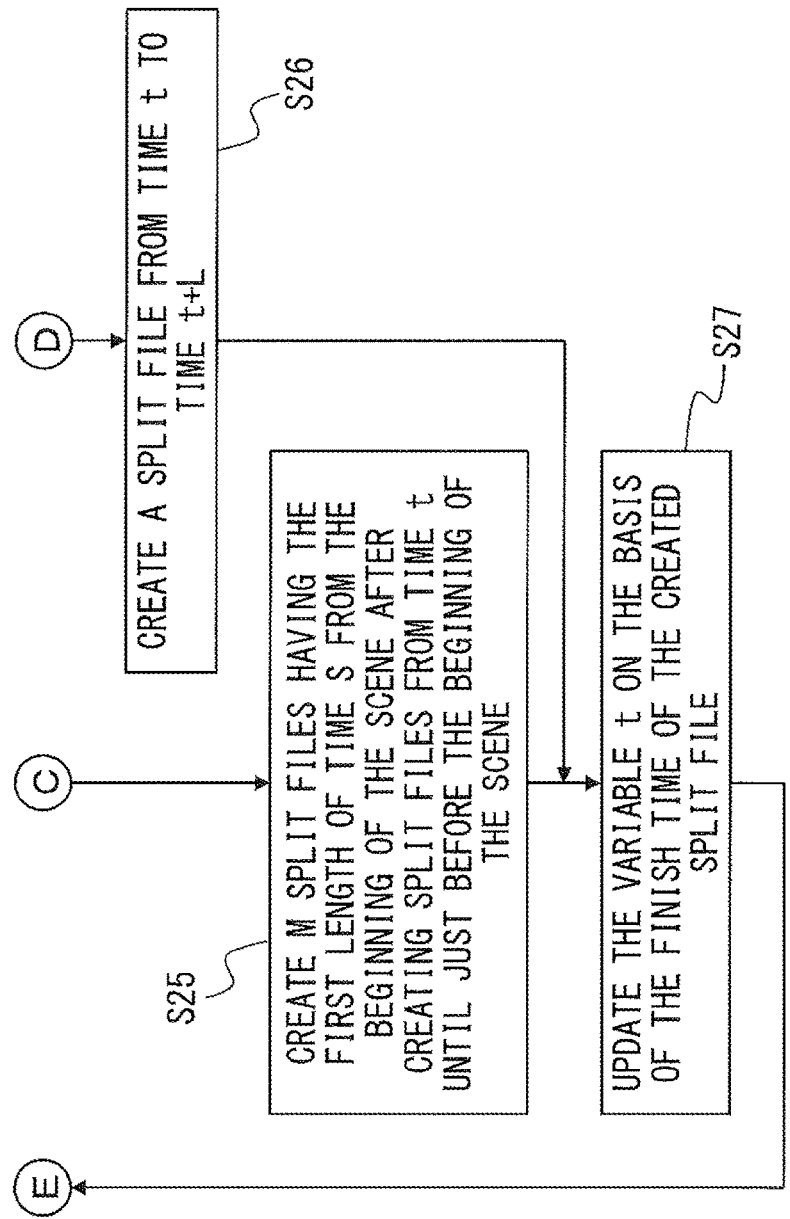
FIG. 16B is Part 2 of a flowchart that illustrates a third example of a method for creating a video data file.
Figure 16C:
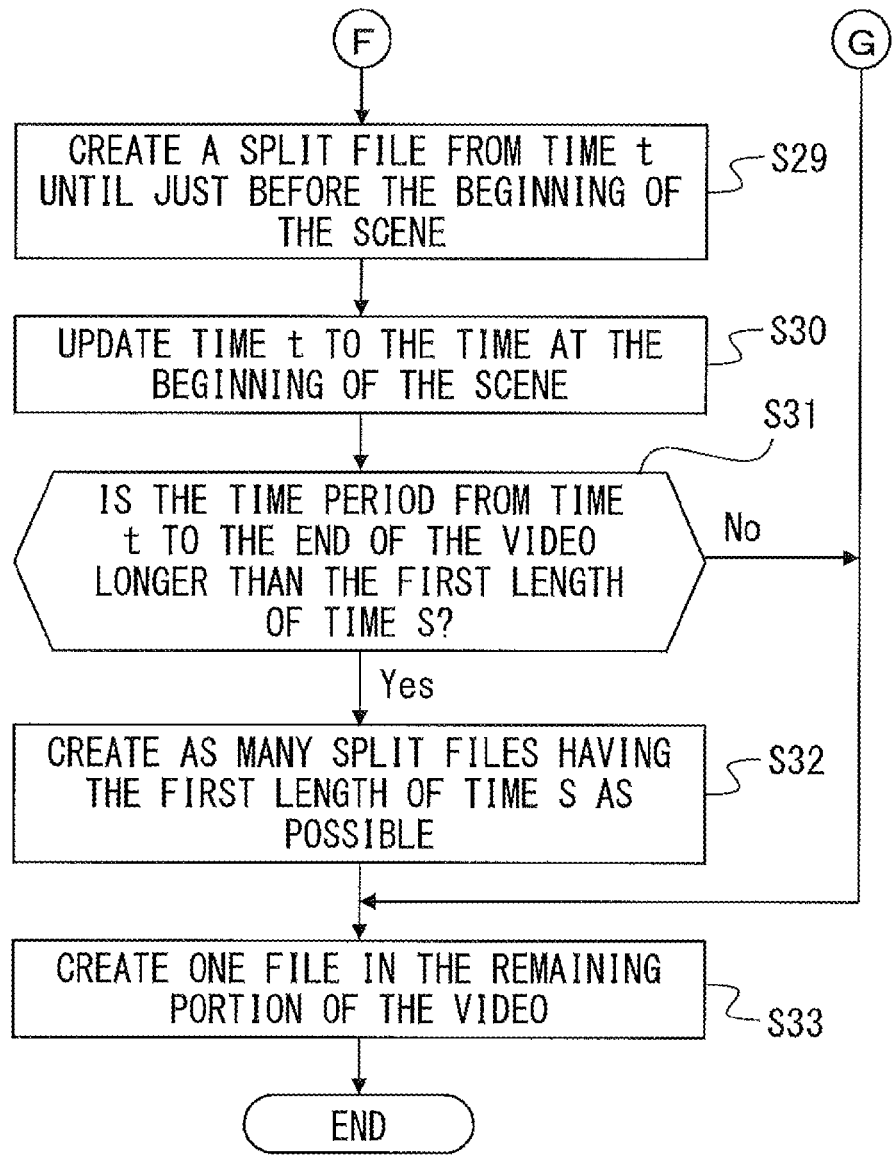
FIG. 16C is Part 3 of a flowchart that illustrates a third example of a method for creating a video data file.

FIG. 16B is Part 2 of a flowchart that illustrates a third example of a method for creating a video data file. FIG. 16C is Part 3 of a flowchart that illustrates a third example of a method for creating a video data file.

Like the first example, the third example of a method for creating a video data file is a method for creating a video data file that is partitioned into split files having a predetermined length of time from the beginning of a scene for each scene, as is the case in the video data file illustrated in FIG. 2A. However, the third example differs from the first example in performing splitting into split files sequentially from the beginning of video data.

In the third example of a method for creating a video data file, first, the video data file generation unit 53 sets a first length of time S, a second length of time L, and the number of split files M having the first length of time, as illustrated in FIG. 16A (Step S20).

Next, the video data file generation unit 53 acquires video data to be split and scene information (Step S21). Then, the video data file generation unit 53 initializes a variable t that represents time (Step S22).

Next, the video data file generation unit 53 confirms whether the video data is as long as time t+L (Step S23). When it is as long as time t+L (Step S23; Yes), the video data file generation unit 53 then confirms whether the beginning of the scene is included in a portion from time t to time t+L in the video (Step S24). When the beginning of the scene is included (Step S24; Yes), the video data file generation unit 53 creates M split files having the first length of time S from the beginning of the scene after creating split files in a portion from time t until just before the beginning of the scene, as illustrated in FIG. 16B (Step S25). In Step S25, when the time period from the beginning of the scene until the finish time of the video data is less than S×M seconds, the video data file generation unit 53 creates as many split files having the first length of time S as possible, and ends the process after creating a split file having a length of time less than the first length of time S.

On the other hand, when the beginning of the scene is not included in the portion from time t to time t+L in the video (Step S24; No), the video data file generation unit 53 creates a split file from time t to time t+L, that is, a split file having the second length of time L (Step S26).

When creating a split file by use of Step S25 or S26, the video data file generation unit 53 updates the variable t on the basis of the finish time of the created split file (Step S27), and returns to Step S23. When creating the split file by use of Step S25, the video data file generation unit 53 sets the finish time of the M-th split file having the first length of time S as a new value of the variable t. Further, when creating the split file by use of Step S26, the video data file generation unit 53 sets time t+L as a new value of the variable t.

The video data file generation unit 53 repeats the processes of Steps S23 to S27, and when there is no longer a video portion that has not been split into split files before time t+L (Step S23; No), next, it confirms whether the beginning of the scene is included in a portion after time t in the video (Step S28). When the beginning of the scene is not included (Step S28; No), the video data file generation unit 53 creates one file in the remaining portion of the video (the portion after time t), as illustrated in FIG. 16C (Step S33), and ends the process.

On the other hand, when the beginning of the scene is included (Step S28; Yes), as illustrated in FIG. 16C, the video data file generation unit 53 creates a split file in a portion from time t until just before the beginning of the scene (Step S29), and updates the variable t to the time at the beginning of the scene (Step S30).

Next, the video data file generation unit 53 confirms whether the time period from time t to the end of the video is longer than the first length of time S (Step S31). When it is not longer than the first length of time (Step S31; No), the video data file generation unit 53 creates one file in the remaining portion of the video (the portion after time t) (Step S33), and ends the process.

On the other hand, when the time period is longer than the first length of time (Step S31: Yes), the video data file generation unit 53 creates as many files having the first length of time S as possible (Step S32). Then, the video data file generation unit 53 creates one split file in the remaining portion of the video (the portion after time t) (Step S33), and ends the process.

Figures 17A, 17B:
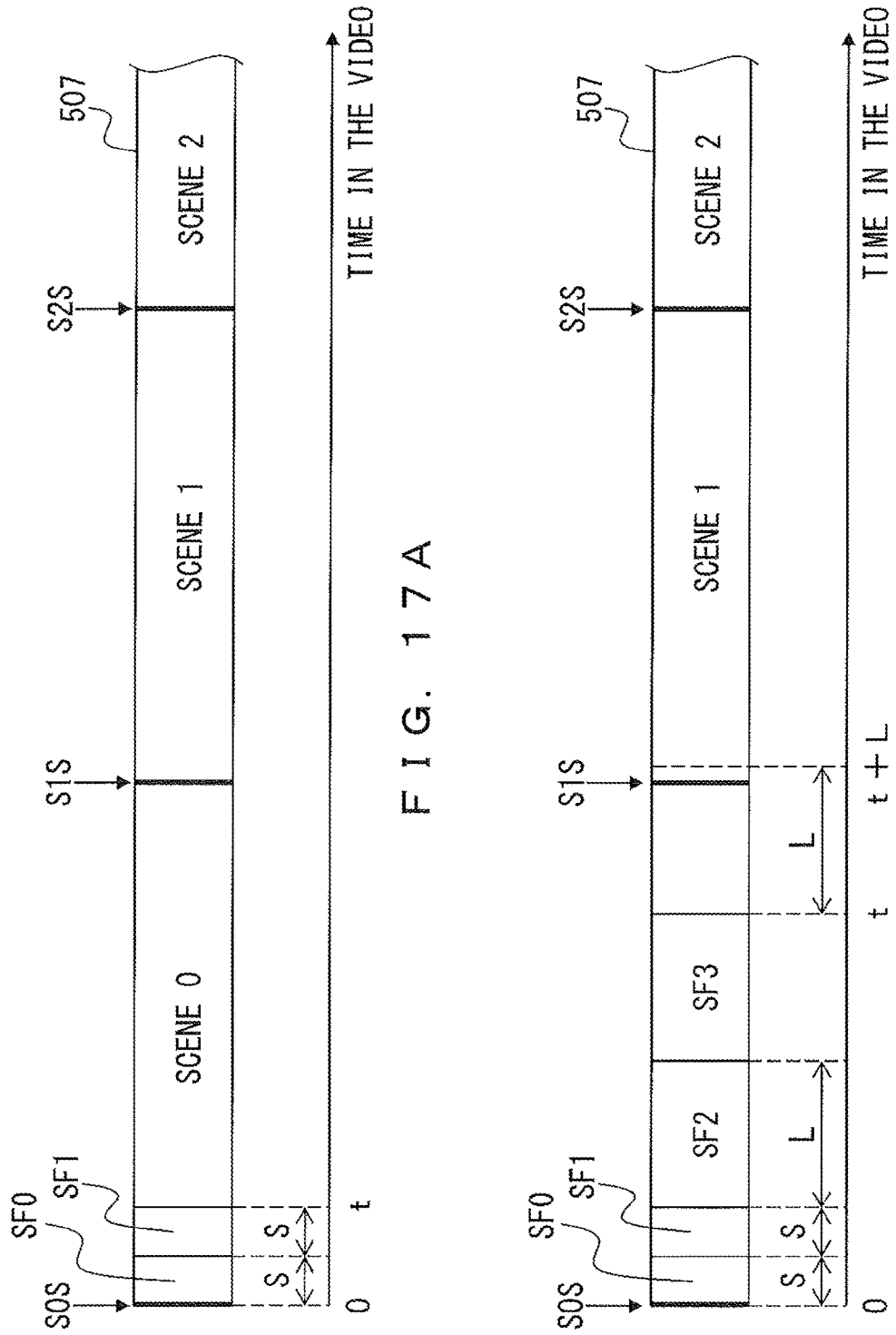
FIG. 17A is a diagram (Part 1) that illustrates a specific example with respect to the third example of a method for creating a video data file.
FIG. 17B is a diagram (Part 2) that illustrates a specific example with respect to the third example of a method for creating a video data file.

FIG. 17A is a diagram (Part 1) that illustrates a specific example with respect to the third example of a method for creating a video data file. FIG. 17B is a diagram (Part 2) that illustrates a specific example with respect to the third example of a method for creating a video data file. FIG. 17C is a diagram (Part 3) that illustrates a specific example with respect to the third example of a method for creating a video data file. FIG. 17D is a diagram (Part 4) that illustrates a specific example with respect to the third example of a method for creating a video data file.

In a process illustrated in FIGS. 16A to 16C, the video data file generation unit 53 splits video data into split files on the basis of the second length of time L. In this case, as is the case in a video data file 507 illustrated in FIG. 17A, the beginning of the video data is a frame at the beginning of scene 0 S0S. Thus, when the process illustrated in FIGS. 16A to 16C starts, the video data file generation unit 53 creates split files SF0 and SF1 having the first length of time S that are the first two split files from the beginning of the scene (S0S), as illustrated in FIG. 17A.

After that, when the video data file generation unit 53 updates the variable t to the finish time of the split file SF1 and repeats the processes of Steps S23 to S27, split files SF2 and SF3 having the second length of time L are created, as is the case in a video data file 507 illustrated in FIG. 17B. Then, when the video data file generation unit 53 creates the next split file, a frame at the beginning of scene 1 S1S is included in a portion from time t to time t+L in the video. Thus, the video data file generation unit 53 creates, next to the split file SF3, a split file SF4 in a portion until just before the beginning of scene 1, as illustrated in FIG. 17C. After that, the video data file generation unit 53 subsequently creates first two split files SF5 and SF6 having the first length of time S from the beginning of the scene (S1S).

After that, when such a process is repeated, two split files SF10 and SF11 having the first length of time S are created at a point of a frame at the beginning of scene 2 S2S, as illustrated in FIG. 17D.

FIG. 18A is a diagram (Part 1) that illustrates a fourth example of a method for creating a video data file. FIG. 18B is a diagram (Part 2) that illustrates a fourth example of a method for creating a video data file.

In the first to third examples of methods for creating a video data file, a split file having a fixed length (first length of time S) is created near a playback point, such as the beginning of a scene, which can be designated as a playback starting point. However, when partitioning a portion near the beginning of a scene into split files having a short length of time, it is not restricted to a file having a fixed length, and partition into files having any length may be performed.

In this fourth example, for example, first, the entirety of video data is split into split files LSF having a second length of time L, as is the case in a video data file 508 illustrated in FIG. 18A. Then, from among the split files LSF, split files LSF6, LSF9, and LSF13 that respectively include frames at the beginning of a scene S1S, S2S, and S3S are each re-split into split files having a short length of time. In this case, a split file having a short length of time has any length of time, and the split is performed so that the beginning of a scene is positioned near the beginning of the split file. Further, in this case, there may also be any number of split files to be re-split. For example, in a video data file 508 illustrated in FIG. 18B, the split file LSF6 having the second length of time L that includes a frame at the beginning of scene 1 S1S is split into four split files SSF4 to SSF7 having a short length of time. On the other hand, the split file LSF9 having the second length of time L that includes a frame at the beginning of scene 2 S2S is split into three split files SSF8 to SSF10 having a short length of time. Further, the split file LSF13 having the second length of time L that includes a frame at the beginning of scene 3 S3S is split into two split files SSF14 and SSF15 having a short length of time.

When splitting video data into a plurality of split files, data that has been encoded in accordance with a standard such as MPEG may be split. In this case, when re-splitting a split file LSFq having a second length of time L, it is preferable to match the length of time of the split file with the size of a group of pictures (GOP) of encoding parameters. For example, when the GOP size is one second, the length of time of a file when re-splitting LSFq is preferably set to one second. The reason for this is that, when performing splitting into split files in the middle of the GOP, the processes to be performed are splitting into split files by decoding once, and encoding again.

In other words, when splitting and re-splitting encoded video data, preferably, a value of the shortest length of time is set to the GOP size, and the second length of time L is an integral multiple of the GOP size. Thus, as illustrated in, for example, FIG. 4, when the second length of time L that is set to a value of about ten seconds is three times as long as the first length of time S, the second length of time L is preferably set to nine seconds. This permits the first length of time S to be set to three seconds, that is, an integral multiple of the GOP size, and permits reducing of the time and effort needed for re-splitting.

Further, when the GOP size is one second, it is possible to discretionarily combine split files LSF having a second length of time L on the one-second basis, which makes it easy to bring a re-split point closer to the beginning of a scene.

Figure 19:
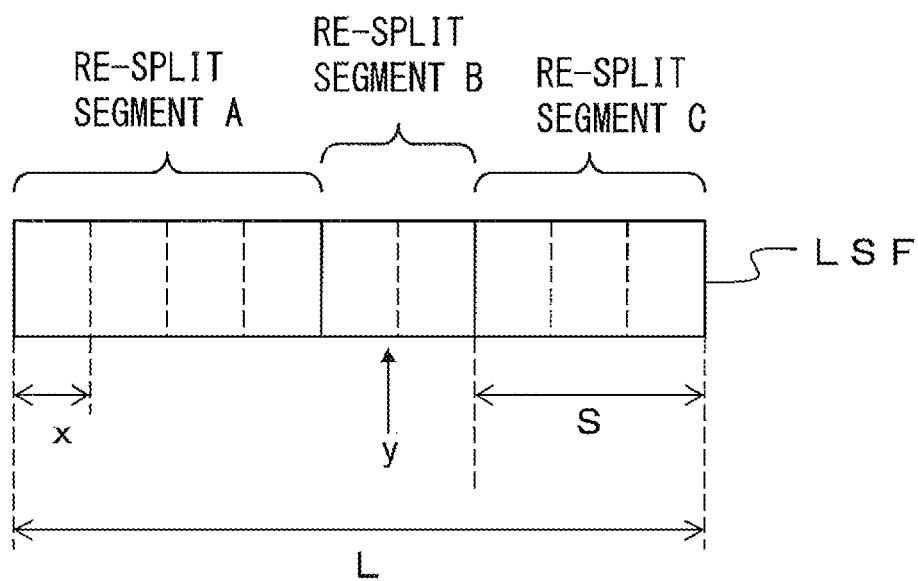
FIG. 19 is a diagram that illustrates a method for setting a length of time of a re-split file in the fourth example.

FIG. 19 is a diagram that illustrates a method for setting a length of time of a re-split file in the fourth example. In the video data file generation unit 53, a split file LSF having a second length of time L encoded for each x seconds that is a GOP size is re-split by, for example, the following procedure.

First, the video data file generation unit 53 creates, in a portion that is prior in time to the beginning of a scene y, one split file (re-split segment A) that is an integral multiple of a GOP size x, and whose time period is as long as possible, as illustrated in FIG. 19.

Next, the video data file generation unit 53 splits a portion in the split file LSF, except for the re-split segment A, by any short length of time S from the end, and when a split by a round number has been successful, it adopts the obtained split file (re-split segment C). When a split by a round number has not been successful, the video data file generation unit 53 creates one split file having the remaining length of time (re-split segment B). In this case, the length of time from the re-split segment A to the re-split segment C is represented using Formulas (2) to (5) below.

$$\text{The size of the re-split segment } A = Y \cdot x \quad (2)$$

$$m = (L - Y \cdot x)/S \quad (3)$$

$$\text{The size of the re-split segment } B = L - (Y \cdot x + S \cdot m) \quad (4)$$

$$\text{The size of the re-split segment } C = S \quad (5)$$

Y in Formula (2) is an integer that is given by y/x. Further, m in Formula (3) is the number of split files having a first length of time.

As described above, it is possible to bring the beginning of the scene y closer to a partition point of a split file that is positioned just before it, by creating, in a portion that is prior to the beginning of the scene y, a split file having a long length of time that is an integral multiple of a GOP size.

FIG. 19 illustrates an example of re-splitting when a first length of time S is set to three seconds. However, the first length of time S is not restricted to three seconds, and it may be, for example, two seconds.

FIG. 20A is a diagram (Part 1) that illustrates another method for re-splitting a split file in the fourth example. FIG. 20B is a diagram (Part 2) that illustrates another method for re-splitting a split file in the fourth example. FIG. 20C is a diagram (Part 3) that illustrates another method for re-splitting a split file in the fourth example.

A split file LSFq in a video data file 509 illustrated in FIG. 20A is a file obtained by splitting by the second length of time L set to ten seconds. When a frame at the beginning of scene n SnS is at a point of four seconds from the beginning of the split file LSFq, as illustrated in FIG. 20B, the split file LSFq is re-split into four files if the re-split is performed by the procedure in accordance with the fourth example described above. In other words, a portion that is prior to the frame at the beginning of the scene SnS includes one split file whose playback time is four seconds. On the other hand, a portion that is posterior to the frame at the beginning of the scene SnS includes three split files whose respective playback times are two seconds each.

Further, when the frame at the beginning of scene n SnS is at a point of 5.3 seconds from the beginning of the split file LSFq, the split file LSFq is re-split into four files, as illustrated in FIG. 20C, if the re-split is performed by the procedure in accordance with the fourth example described above. In other words, in a portion that is prior to the frame at the beginning of the scene SnS, one split file whose playback time is five seconds that is a maximum value from among the integral multiples of the GOP is generated. On the other hand, in a portion that is posterior to the frame at the beginning of the scene SnS, two split files whose respective playback times are two seconds each are generated. Then, finally, a portion of the remaining one second that is positioned near the frame at the beginning of the scene SnS is generated as a split file.

As described above, for example, the video data file generation unit 53 can determine a length of time of a re-split segment so that a waiting time for transfer does not occur depending on the features of a scene, by appropriately changing the length of time for splitting into split files having a short length of time, according to the point of the beginning of the scene.

FIG. 21 is a table that illustrates yet another method for re-splitting a split file in the fourth example. FIG. 22A is a diagram (Part 1) that illustrates an example of re-splitting by use of previously provided split patterns. FIG. 22B is a diagram (Part 2) that illustrates an example of re-splitting by use of previously provided split patterns. FIG. 22C is a diagram (Part 3) that illustrates an example of re-splitting by use of previously provided split patterns.

The re-split of a split file obtained by splitting by the second length of time L can also be performed, for example, on the basis of the split pattern according to the location of a frame at the beginning of a scene. In this case, a split pattern list as illustrated in FIG. 21 is previously provided in the video data file generation device 5. The split pattern list represents a correspondence relationship between a time period Δt from the beginning of a file to the beginning of a scene and a ratio of the number of split files to a length of time when performing a re-split.

For example, consider that a split file LSFq obtained by splitting by the second length of time L set to ten seconds, as is the case in a video data file 510 illustrated in FIG. 22A, is re-split. It is assumed that, here, as illustrated in FIG. 22B, a frame at the beginning of scene n SnS is included in the split file LSFq and that the time period ΔT from the beginning of the file to the beginning of the scene is one second. Here, referring to the split pattern list illustrated in FIG. 21, the split pattern when the time period ΔT is one second is 1:3:3:3. Thus, the video data file generation device 5 (video data file generation unit 53) generates four re-split files obtained by splitting the split file LSFq so that the ratio between the lengths of time of the re-split files is 1:3:3:3.

Further, it is assumed that, as illustrated in FIG. 22C, a frame at the beginning of scene n SnS is included in the split file LSFq and that the time period ΔT from the beginning of the file to the beginning of the scene is three seconds. In this case, referring to the split pattern list illustrated in FIG. 21, the split pattern is 3:3:4. Thus, the video data file generation device 5 generates three re-split files obtained by splitting the split file LSFq so that the ratio between the lengths of time of the re-split files is 3:3:4.

In this way, a split file can be efficiently re-split in a short time by re-splitting the file by use of a split pattern list, and the load of a video data file generation device can be reduced.

As described above, the waiting time until the playback starts can be shortened by splitting, into split files having a short length of time, a video portion near a playback point, such as the beginning of a scene, which can be designated as a playback starting point when splitting video data into a plurality of split files for delivery. Further, it is possible to switch to the transfer of a split file having a long length of time after a split file having a short length of time is transferred the predetermined number of times, which permits suppressing of an increase in the number of communications between a client and a delivery server. As a result, it is possible, at the same time, to shorten the waiting time until the playback starts and to suppress an increase in the load of the delivery server caused by an increase in the number of communications with the client.

Further, the provision of a first video data file split into split files having a short length of time and a second video data file split into split files having a long length of time permits the delivery server 2 to transfer a split file having a short length of time when the playback starts, regardless of the playback starting point.

A combination of a first length of time S and a second length of time L and the number of split files having the first length of time S that are to be transferred when the playback starts can be appropriately changed according to the transfer rate or playback rate of a split file.

The video data file generation device according to the present embodiment is realized by, for example, a computer and a program that causes the computer to perform the splitting process described above. In this case, it is sufficient if the computer that can be used as the video data file generation device has a hardware configuration equivalent to that of the computer 300 (client 3) as illustrated in FIG. 9.

Figure 23:
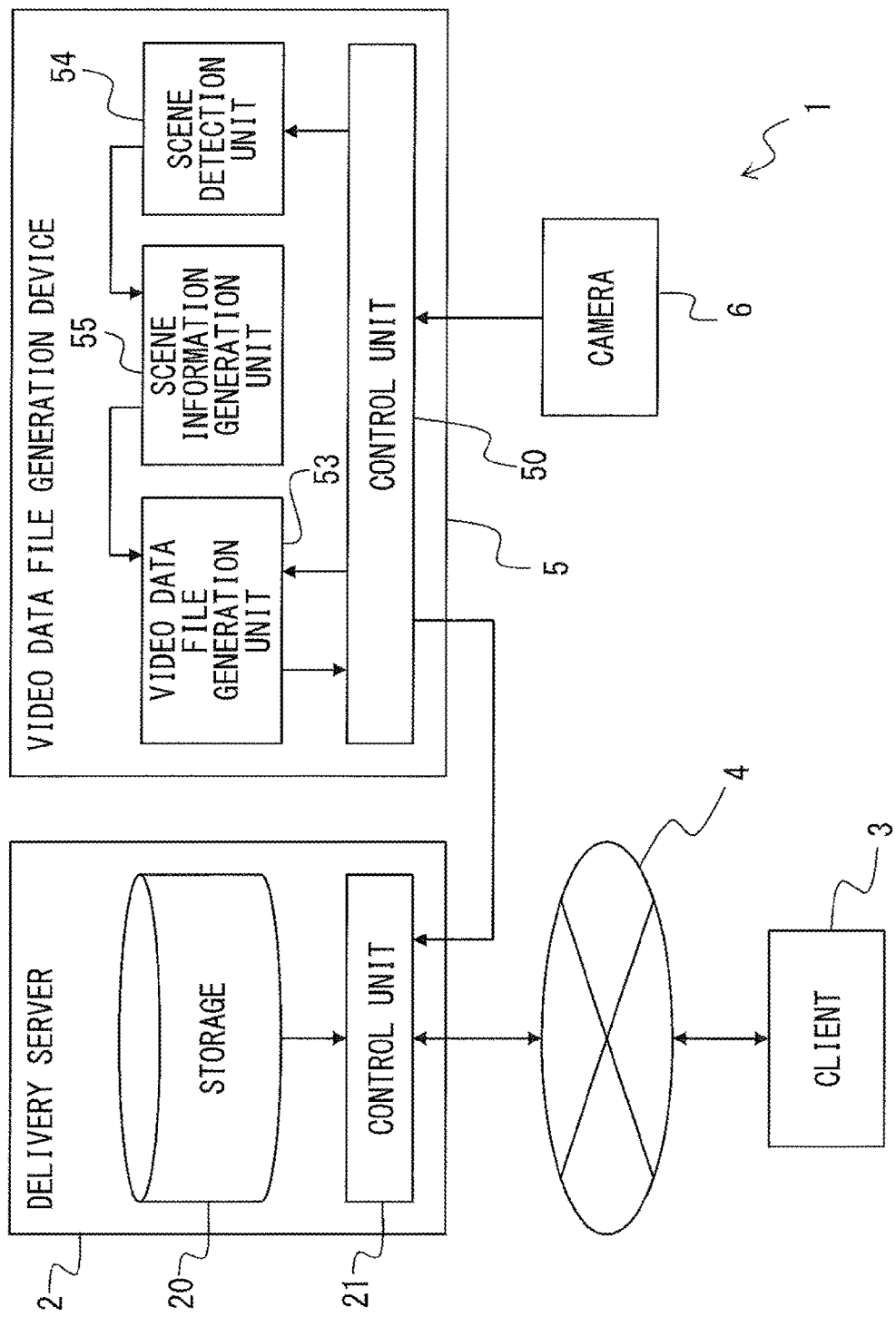
FIG. 23 is a block diagram that illustrates another example of a video data file generation device.

FIG. 23 is a block diagram that illustrates another example of a video data file generation device. The configuration illustrated in FIG. 10 as a configuration of a video data file generation device 5 according to the present embodiment is for creating a video data file for delivery by use of video data and scene information acquired from an external device such as a camera 6.

However, the video data file generation device 5 is not restricted to this, and it may be a device for generating scene information in itself, as illustrated in FIG. 23. A video data file generation device 5 illustrated in FIG. 23 includes a control unit 50, a scene detection unit 54, a scene information generation unit 55, and a video data file generation unit 53. The scene detection unit 54 detects the beginning of a scene by use of, for example, the features common to a plurality of frames (images) in video data, and a changing pattern of information in an adjacent frame. In the case of video data of baseball, the scene detection unit 54 detects a pitching scene or the start of the pitching scene by use of, for example, features of a video when a pitcher starts a motion of pitching.

For example, the beginning of a scene in video data such as the start of an inning and when a pitcher starts a motion of pitching may be detected on the basis of features of a frame included in the video data that are acquired as a result of the scene detection unit performing image analysis on the video data.

In particular, when detecting the start of a motion of pitching by a pitcher, image features common to the frames included in the video during pitching are identified in advance, and the scene detection unit performs a process of comparing the image features during pitching to the image features of each of the frames included in the video data, or some frames whose scenes are to be detected. Then, as a result of the comparison, the scene detection unit 54 detects, as a frame included in the video during pitching, a frame having an image feature that is identical to or has a correlation stronger than a predetermined degree with the image features common to the frames included in the video during pitching.

For example, the scene detection unit 54 may consider, as a pitching scene, a video portion that includes the consecutive frames detected as frames included in a video during pitching, and may detect, as the beginning of the scene, either a frame at the beginning of the consecutive frames, or any of the frames included in portions that are before and after the frame at the beginning of the consecutive frames and that each include the predetermined number of frames.

The scene information generation unit 55 adds information such as a start time (finish time) of each scene, on the basis of the scene detected in the scene detection unit 54.

The lists illustrated in, for example, FIGS. 2B, 2C, and 21 are merely examples, and various modification may be made to them in any implementation.

The flowcharts illustrated in, for example, FIGS. 11A to 11c, 13A and 13B, and 16A to 16C are merely examples, and various modifications may be made to them in any implementation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A video transmission method for transmitting, to a video playback device, a video data file group that corresponds to a selected scene from among a plurality of scenes included in video data, the video transmission method comprising:
    causing a processor to execute a process including storing, in a storage, a video data file group that includes split files corresponding to the first length of time that are obtained by splitting a video portion near a playback point in the video data file that can be designated as a playback starting point in the video data, and a video data file group that includes split files corresponding to the second length of time that are obtained by splitting a different video portion than the video portion near the playback point, the second length of time being longer than the first length of time;
    causing the processor to execute a process including identifying the scene that is to be transmitted to the video playback device on the basis of a transmission request from the video playback device; and
    causing the processor to execute a process including reading a plurality of video data files included in the video data file group corresponding to the identified scene from the storage and transmitting the plurality of video data files to the video playback device in a chronological order, wherein
    the processor executes, when reading the plurality of video data files from the storage unit, reading, first predetermined number of times, the video data file that is stored in the storage and that corresponds to the first length of time, and reading the video data file that is stored in the storage and that corresponds to the second length of time after reading the predetermined number of times.

2. The video transmission method according to claim 1, wherein
    the processor sets the predetermined number to one.

3. The video transmission method according to claim 1, wherein
    the processor makes a length of time corresponding to the video data file relatively short even when any of the plurality of scenes is selected, the video data file corresponding to a beginning side in a transmission order of the video data file group that corresponds to the selected scene.

4. The video transmission method according to claim 1, wherein
    a length of time corresponding to the video data file has a correlation with a playback time when playing back a video by use of the video data file.

5. A video transmission apparatus that sequentially transmits video data files to a video playback device that plays back a video on the basis of received video data files, the video transmission apparatus comprising:
    a storage configured to store therein a video data file group that includes video data files corresponding to the first length of time that are obtained by splitting a video portion near a playback point in the video data that can be designated as a playback starting point, and a video data file group that includes video data files corresponding to a second length of time that are obtained by splitting a different video portion than the video portion near the playback point, the second length of time being longer than the first length of time; and
    a processor configured to execute a process including:
        identifying a scene included in video data that is to be transmitted to the video playback device on the basis of a transmission request from the video playback device; and
        reading a plurality of video data files included in the video data file group corresponding to the identified scene from the storage and transmitting the plurality of video data files to the video playback device in a chronological order, wherein
    the processor executes, when reading the plurality of video data files from the storage, reading, first predetermined number of times, the video data file that is stored in the storage and that corresponds to the first length of time, and reading the video data file that is stored in the storage and that corresponds to the second length of time after reading the predetermined number of times.

6. The video transmission apparatus according to claim 5, wherein
    the processor sets the predetermined number to one.

7. The video transmission apparatus according to claim 5, wherein
    when transmitting the video data file group to the video playback device, the processor makes a length of time corresponding to a video data file relatively short even when any of the plurality of scenes is selected, the video data file corresponding to a beginning side in a transmission order of the video data file group that corresponds to the selected scene.

8. The video transmission apparatus according to claim 5, wherein
a length of time corresponding to the video data file has a correlation with a playback time when playing back a video by use of the video data file.

9. The video transmission apparatus according to claim 5, wherein
the storage stores therein a first video data file group that includes video data files corresponding to the first length of time that are obtained by splitting one video data, and a second video data file group that includes video data files corresponding to the second length of time that are obtained by splitting the video data, and
when reading, from the storage, a video data file to be transmitted to the video playback device, the processor reads, the first predetermined number of times, the video data file corresponding to the first length of time that is included in the first video data file group, and reads the video data file corresponding to the second length of time that is included in the second video data file group after reading the predetermined number of times.

10. A non-transitory computer-readable recording medium having stored therein a program that causes a computer to execute a process for transmitting, to a video playback device, a video data file group that corresponds to a selected scene from among a plurality of scenes included in video data, the process comprising:
storing, in a storage, the video data file group that includes video data files corresponding to a first length of time that are obtained by splitting a video portion near a playback point in the video data that can be designated as a playback starting point, and a video data file group that includes video data files corresponding to a second length of time that are obtained by splitting a different video portion than the video portion near the playback point, the second length of time being longer than the first length of time;
identifying the scene that is to be transmitted to the video playback device on the basis of a transmission request from the video playback device; and
reading a plurality of video data files included in the video data file group that correspond to the identified scene from the storage and transmitting the plurality of video data files to the video playback device in a chronological order, wherein
reading the plurality of video data files included in the video data file group from the storage includes reading, first predetermined number of times, the video data file that is stored in the storage and that corresponds to the first length of time, and reading the video data file that is stored in the storage and that corresponds to the second length of time after reading the predetermined number of times.

11. The non-transitory computer-readable recording medium having stored therein the program according to claim 10, wherein
the process includes setting the predetermined number to one.

12. The non-transitory computer-readable recording medium having stored therein the program according to claim 10, wherein
reading the plurality of video data files is making a length of time corresponding to a video file relatively short even when any of the plurality of scenes is selected, the video data file corresponding to the beginning side in a transmission order of the video data file group that corresponds to the selected scene.

13. The non-transitory computer-readable recording medium having stored therein the program according to claim 10, wherein
a length of time corresponding to the video data file has a correlation with a playback time when playing back a video by use of the video data file.

14. The non-transitory computer-readable recording medium having stored therein the program according to claim 10, the process further comprising:
storing, in the storage, a first video data file group that includes video data files corresponding to the first length of time that are obtained by splitting one piece of video data, and a second video data file group that includes video data files corresponding to the second length of time that are obtained by splitting the video data; and
selectively reading, from the storage, the video data file in the first video data file group and the video data file in the second video data file group, and transmitting the video data files to the video playback device in the chronological order.

15. The non-transitory computer-readable recording medium having stored therein the program according to claim 14, wherein
the selectively reading, from the storage unit, the video data file in the first video data file group and the video data file in the second video data file group is reading, the first predetermined number of times, the video data file that corresponds to the first length of time, and reading the split file that corresponds to the second length of time after reading the predetermined number of times.

16. The non-transitory computer-readable recording medium having stored therein the program according to claim 14, the process further comprising:
determining the predetermined number of times the video data file corresponding to the first length of time is read, on the basis of the bitrate of the video data file and the transfer rate of a data file when transmitting the video data file to the video playback device.

17. The non-transitory computer-readable recording medium having stored therein the program according to claim 10, the process further comprising:
selectively outputting, to the video playback device, information indicating the playback point in the video data that can be designated as the playback starting point; and
transmitting the video data file group to the video playback device, as a starting point corresponding to the designation, a playback point selected in the video playback device from among the playback points that can be designated as the playback starting point.

18. The non-transitory computer-readable recording medium having stored therein the program according to claim 10, the process further comprising:
when the video data file group includes video data files obtained by splitting a video of a sports game, identifying images including a predetermined feature in common by analyzing images included in the video data file group, and setting a playback point of an image including the predetermined feature in common as a playback starting point.

19. The video transmission method according to claim 1, wherein the second length of time is equal to a sum of the first lengths of time that correspond to the predetermined number of times.

20. The video transmission method according to claim 1, the video transmission method further comprising:

when splitting one of the plurality of scenes into a plurality of video data files and transmitting the plurality of video data files to the video playback device in a chronological order, causing the processor to execute the process including making a length of time corresponding to each of the predetermined number of video data files shorter than a length of time corresponding to the video data file to be transmitted subsequent to the transmission of the predetermined number of video data files, wherein the predetermined number of video data files include the video data file to be first transmitted, and are sequentially transmitted, wherein when the selected scene is not a scene that includes a beginning of video data, the length of time of the video data file transmitted next to the predetermined number of video data files is equal to a sum of a length of time of each of the video data files corresponding to the predetermined number of times that include the video data file that includes the beginning of the selected scene and a length of time of a video data file immediately preceding the video data file including the beginning of the scene.

* * * * *